(12) United States Patent
Wakizaka et al.

(10) Patent No.: US 10,870,224 B2
(45) Date of Patent: Dec. 22, 2020

(54) METHOD OF MANUFACTURING ANTIREFLECTION FILM

(71) Applicant: FUJIFILM Corporation, Tokyo (JP)

(72) Inventors: Daiki Wakizaka, Kanagawa (JP); Ayako Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 399 days.

(21) Appl. No.: 15/861,023

(22) Filed: Jan. 3, 2018

(65) Prior Publication Data

US 2018/0141245 A1 May 24, 2018

Related U.S. Application Data

(63) Continuation of application No. PCT/JP2016/069923, filed on Jul. 5, 2016.

(30) Foreign Application Priority Data

Jul. 6, 2015 (JP) .................. 2015-135572

(51) Int. Cl.
  *B29C 41/12* (2006.01)
  *B32B 5/16* (2006.01)
  (Continued)

(52) U.S. Cl.
  CPC .............. *B29C 41/12* (2013.01); *B29C 41/22* (2013.01); *B29C 41/42* (2013.01); *B32B 5/16* (2013.01); *B32B 27/20* (2013.01); *G02B 1/111* (2013.01); *G02B 1/118* (2013.01); *B29K 2071/00* (2013.01); *B29K 2509/08* (2013.01); *B29L 2007/00* (2013.01); *B32B 38/08* (2013.01); *B32B 38/10* (2013.01); *B32B 2457/20* (2013.01); *G02B 7/00* (2013.01)

(58) Field of Classification Search
  CPC .. G02B 1/118; G03F 7/00; B32B 5/16; B29C 41/12
  See application file for complete search history.

(56) References Cited

FOREIGN PATENT DOCUMENTS

JP  H07-104103 A  4/1995
JP  2009-139796 A  6/2009
(Continued)

OTHER PUBLICATIONS

JP3360898 translation (Year: 1995).*
(Continued)

*Primary Examiner* — Timothy Kennedy
*Assistant Examiner* — Alexander A Wang
(74) *Attorney, Agent, or Firm* — Edwards Neils LLC; Jean C. Edwards, Esq.

(57) ABSTRACT

Provided is a method of manufacturing an antireflection film including, in order: a step (1) of providing a layer (a) containing a curable compound (a1) and a particle (a2) having an average primary particle diameter of 100 nm to 380 nm and a layer (b) containing a compound (b1) incompatible with the curable compound (a1) so that the particle (a2) is buried in a layer defined by combining the layer (a) and the layer (b), on a substrate; a step (2) of curing the layer (a) in a state in which the particle (a2) is buried in the layer defined by combining the layer (a) and the layer (b); and a step (3) of removing the layer (b) to form an uneven shape on a surface of the layer (a) with the particle (a2).

20 Claims, 2 Drawing Sheets

(51) Int. Cl.
  *B32B 27/20* (2006.01)
  *G02B 1/118* (2015.01)
  *B29C 41/22* (2006.01)
  *B29C 41/42* (2006.01)
  *G02B 1/111* (2015.01)
  B32B 38/10 (2006.01)
  B32B 38/08 (2006.01)
  G02B 7/00 (2006.01)
  B29K 71/00 (2006.01)
  B29K 509/08 (2006.01)
  B29L 7/00 (2006.01)

(56) References Cited

FOREIGN PATENT DOCUMENTS

| | | |
|---|---|---|
| JP | 2010-164823 A | 7/2010 |
| JP | 2012-163794 A | 8/2012 |

OTHER PUBLICATIONS

JP2012163794 translation (Year: 2012).*
International Search Report issued in PCT/JP2016/069923 dated Oct. 11, 2016.
Written Opinion issued in PCT/JP2016/069923 dated Oct. 11, 2016.
International Preliminary Report on Patentability completed by WIPO dated Jan. 9, 2018, in connection with International Patent Application No. PCT/JP2016/069923.

* cited by examiner (1)

(1-2)

(2)

(3)

10

METHOD OF MANUFACTURING ANTIREFLECTION FILM

CROSS-REFERENCE TO RELATED APPLICATIONS

This is a continuation of International Application No. PCT/JP2016/069923 filed on Jul. 5, 2016, which was published under Article 21(2) in Japanese, and which claims priority under 35 U.S.C. § 119(a) from Japanese Patent Application No. 2015-135572 filed on Jul. 6, 2015. The above applications are hereby expressly incorporated by reference in their entirety, into the present application.

BACKGROUND OF THE INVENTION

1. Field of the Invention

The present invention relates to a method of manufacturing an antireflection film.

2. Description of the Related Art

In an image display device such as a display device using a cathode ray tube (CRT), a plasma display panel (PDP), an electroluminescent display (ELD), a vacuum fluorescent display (VFD), a field emission display (FED), and a liquid crystal display (LCD), an antireflection film may be provided in order to prevent decrease in contrast due to reflection of external light on a display surface and reflected glare of an image. In addition to the image display device, the antireflection function may be provided to a glass surface of the showroom or the like by an antireflection film.

As the antireflection film, an antireflection film having a fine uneven shape with a period equal to or less than the wavelength of visible light on the surface of a substrate, that is, an antireflection film having a so-called moth eye structure is known. The moth eye structure makes a refractive index gradient layer in which the refractive index successively changes in a pseudo manner from the air toward the bulk material inside the substrate, and reflection of the light can be prevented.

As an antireflection film having a moth eye structure, JP2009-139796A discloses the antireflection film having a moth eye structure manufactured by a method of coating a transparent substrate with a coating liquid containing a transparent resin monomer and a fine particle, curing the coating liquid, forming a transparent resin in which a fine particle is dispersed, and then etching the transparent resin.

SUMMARY OF THE INVENTION

However, in the technique of JP2009-139796A, the transparent resin is required to be etched, and a step of manufacturing the antireflection film becomes complicated in some cases.

An object of the present invention is to provide a method of simply manufacturing an antireflection film having satisfactory antireflection properties, having a low haze, and having low muddiness.

In order to solve the above problems, the inventors of the present invention have conducted research on the forming of a moth eye structure by applying a composition containing a particle and a curable compound for forming a binder on a substrate. However, in a case where the particle is exposed to the air interface during the period from coating to curing, the particle easily aggregates, and muddiness is caused in some cases. The inventors of the present invention have further conducted research to find a method of forming a satisfactory uneven shape with a particle by laminating another layer on an upper side (a side opposite to the interface on the substrate side) of the particle, by causing the particle to not be exposed to the air interface during the period from coating to curing and removing the laminated layer after the curing.

That is, the present inventors have found that the above object can be achieved by the following means.

[1] A method of manufacturing an antireflection film, comprising, in order:
a step (1) of providing a layer (a) including a curable compound (a1) and a particle (a2) having an average primary particle diameter of 100 nm to 380 nm and a layer (b) including a compound (b1) incompatible with the curable compound (a1) in a thickness in which particle (a2) is buried in a layer defined by combining the layer (a) and the layer (b), on a substrate;
a step (2) of curing the layer (a) in a state in which the particle (a2) is buried in a layer defined by combining the layer (a) and the layer (b); and
a step (3) of removing the layer (b) and forming an uneven shape on a surface of the layer (a) with the particle (a2).
[2] The method of manufacturing an antireflection film according to [1], in which the layer (a) and the layer (b) are provided on the substrate in this order by coating.
[3] The method of manufacturing an antireflection film according to [1] or [2], in which the compound (b1) is a liquid oily component at 50° C.
[4] The method of manufacturing an antireflection film according to any one of [1] to [3], in which at least one of the compounds (b1) has a boiling point of 110° C. or higher and a kinematic viscosity of 0.1 $mm^2/s$ to 100,000 $mm^2/s$ at 25° C.
[5] The method of manufacturing an antireflection film according to [4], in which a difference between a surface tension of a surface of the layer (a) and a surface tension of the compound (b1) having a boiling point of 110° C. or higher is 0 to 10 mN/m.
[6] The method of manufacturing an antireflection film according to any one of [1] to [5], in which a maximum transmittance at a wavelength of 250 nm to 300 nm, in a thickness in the step (2), of the compound (b1) is 20% or greater.
[7] The method of manufacturing an antireflection film according to [1], in which, in the step (1), the layer (b) is formed by laminating a laminate obtained by providing the layer (b) on a temporary support to the layer (a).
[8] The method of manufacturing an antireflection film according to [7], in which the layer (b) is a pressure sensitive adhesive layer.
[9] The method of manufacturing an antireflection film according to [7] or [8], in which a difference between a surface tension of a surface of the layer (a) and a surface tension of a surface on the layer (b) side of the laminate obtained by providing the layer (b) on the temporary support is −10 to 15 mN/m.
[10] The method of manufacturing an antireflection film according to any one of [7] to [9], in which the maximum transmittance at a wavelength of 250 nm to 300 nm of the laminate obtained by providing the layer (b) on the temporary support is 20% or greater.
[11] The method of manufacturing an antireflection film according to any one of [1] to [10], in which, in the step (3), a solvent that dissolves the compound (b1) without dissolving the substrate is used.

[12] The method of manufacturing an antireflection film according to any one of [1] to [11], in which, after the step (3), in a direction orthogonal to a surface of the substrate, a plurality of particles (a2) do not exist.

[13] The method of manufacturing an antireflection film according to any one of [1] to [12], in which, in the steps (1) and (2), a total film thickness of a film thickness of a portion of the layer (a) in which the particle (a2) does not exist, and a film thickness of the layer (b) is greater than an average primary particle diameter of the particle (a2).

[14] The method of manufacturing an antireflection film according to any one of [1] to [13], in which at least one of the curable compounds (a1) is a compound having three or more (meth)acryloyl groups in one molecule.

[15] The method of manufacturing an antireflection film according to any one of [1] to [14], in which the particle (a2) is a metal oxide particle.

[16] The method of manufacturing an antireflection film according to any one of [1] to [15], in which the particle (a2) is a particle subjected to surface modification.

[17] The method of manufacturing an antireflection film according to any one of [1] to [16], further comprising: a step (1-2) of causing a portion of the curable compound (a1) to permeate the substrate between the steps (1) and (2).

[18] The method of manufacturing an antireflection film according to [17], in which, in the step (1-2), a laminate having the substrate, the layer (a) and the layer (b) is heated.

[19] The method of manufacturing an antireflection film according to [18], in which a temperature during the heating is 80° C. to 180° C.

[20] The method of manufacturing an antireflection film according to [18] or [19], in which a boiling point of at least one of the compounds (b1) is the temperature during the heating or greater.

According to the present invention, it is possible to provide a method of simply manufacturing an antireflection film having satisfactory antireflection properties, having a low haze, and having low muddiness.

DESCRIPTION OF THE PREFERRED EMBODIMENTS

[Method of Manufacturing Antireflection Film]

The method of manufacturing an antireflection film of the present invention is a method of manufacturing an antireflection film sequentially including:

a step (1) of providing a layer (a) including a curable compound (a1) and a particle (a2) having an average primary particle diameter of 100 nm to 380 nm and a layer (b) including a compound (b1) incompatible with the curable compound (a1) in a thickness in which particle (a2) is buried in a layer defined by combining the layer (a) and the layer (b) on a substrate;

a step (2) of curing the layer (a) in a state in which the particle (a2) is buried in a layer defined by combining the layer (a) and the layer (b); and a step (3) of removing the layer (b) and forming an uneven shape on a surface of the layer (a) with the particle (a2).

Figure 1:
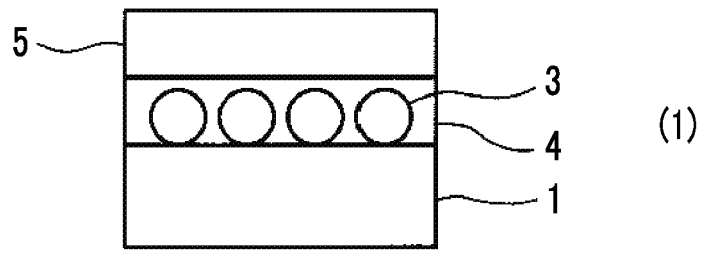
FIG. 1 is a schematic view illustrating an example of a method of manufacturing an antireflection film of the present invention.
Figure 1:
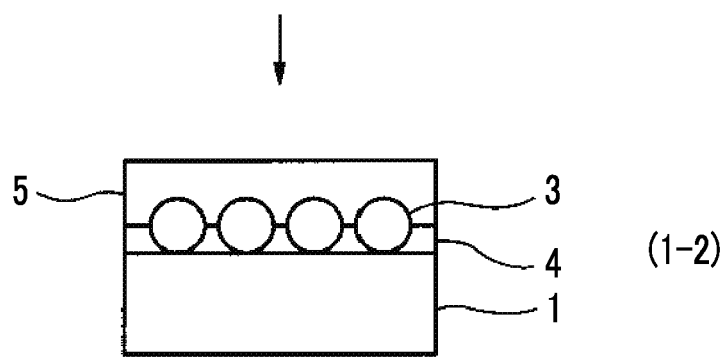
Figure 1:
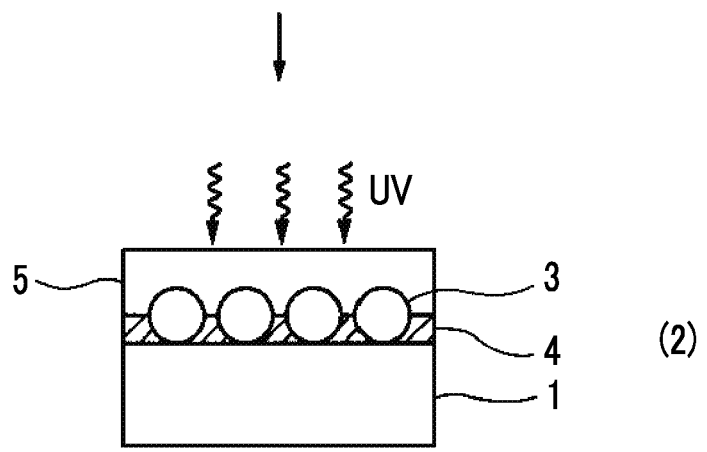
Figure 1:
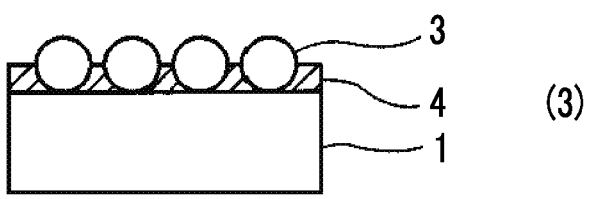

An example of a preferable embodiment of a method of manufacturing an antireflection film of the present invention is illustrated in FIG. 1.

(1) of FIG. 1 schematically illustrates a state in which in the step (1), the layer (a) (reference numeral 4 in FIG. 1) including the curable compound (a1) and the particle (a2) (reference numeral 3 in FIG. 1) having an average primary particle diameter of 100 nm to 380 nm and the layer (b) (reference numeral 5 in FIG. 1) including the compound (b1) incompatible with the curable compound (a1) are provided from a side close to the substrate in a thickness in which the particle (a2) is buried in the layer defined by combining the layer (a) and the layer (b) on a substrate.

(1-2) of FIG. 1 schematically illustrates a state in which, in the following step (1-2), a portion of the curable compound (a1) of the layer (a) permeate the substrate (in a case where the substrate has a functional layer, a portion of the curable compound (a1) may permeate the functional layer) and the layer (a) has the uneven shape due to the particle (a2).

(2) of FIG. 1 schematically illustrates that, in the step (2), the layer (a) is cured in a state in which the particle (a2) is buried in the layer defined by combining the layer (a) and the layer (b).

(3) of FIG. 1 illustrates a state after the layer (b) is removed in the step (3).

[Step (1)]

The step (1) is a step of providing the layer (a) including the curable compound (a1) and the particle (a2) having an average primary particle diameter of 100 nm to 380 nm and the layer (b) of including the compound (b1) incompatible with the curable compound (a1) in a thickness in which the particle (a2) is buried in the layer defined by combining the layer (a) and the layer (b), on a substrate.

In the step (1), a method of providing the layer (a) and the layer (b) on the substrate is not particularly limited, but it is preferable that the layer (a) and the layer (b) are provided on the substrate by coating or that the layer (a) and the layer (b) are provided by laminating a laminate obtained by forming the layer (b) on a temporary support to a laminate obtained by providing the layer (a) on the substrate by coating. In this case, the layer (a) is a layer obtained by applying the composition (A) including the curable compound (a1) and the particle (a2) having an average primary particle diameter of 100 nm to 380 nm, and the layer (b) is a layer including the composition (B) including the compound (b1) incompatible with the curable compound (a1).

In a case where the layer (a) and the layer (b) are provided by coating, two layers may be formed simultaneously or sequentially. In a case where the layer (b) is sequentially provided by coating or a laminate obtained by forming the layer (b) on a temporary support is laminated, a state in which the particle (a2) in the layer (a) is not exposed to the air interface and is not aggregated is preferable.

The coating method is not particularly limited, and well-known methods can be used. Examples thereof include a dip coating method, an air knife coating method, a curtain coating method, a roller coating method, a wire bar coating method, a gravure coating method, and a die coating method.

The composition (A) and the composition (B) may be coated sequentially or may be coated simultaneously. A composition (Liquid 1) obtained by mixing the composition (A) and the composition (B) may be applied to provide the layer (a) and the layer (b) by phase separation.

In a case where the layer (b) is provided on the layer (a) by laminating the laminate obtained by forming the layer (b)

on the temporary support to the laminate obtained by providing the layer (a) on the substrate by coating, the layer (b) is formed in advance by coating a temporary support different from the temporary support on which the layer (a) is provided by coating with the composition (B) including the compound (b1) incompatible with the curable compound (a1). The substrate on which the layer (a) is formed and the temporary support on which the layer (b) is formed are laminated such that the layer (a) and the layer (b) are in contact with each other to form the respective layers. The laminating method is not particularly limited, and well-known methods can be used.

In a case where the layer (b) is provided in a separate manner, not simultaneously, the layer (a) is provided in a thickness in which the particle (a2) is buried in the layer (a).

The burying thickness refers to a thickness in which, during the period from the step (1) and the step (2), the particle (a2) is not exposed in the layer (b) provided on the layer (a), and the particle (a2) is not in contact with the air interface of the layer (b) or the temporary support of the laminate obtained by providing the layer (b) on the temporary support. That is, even in a case where the curable compound (a1) or a solvent is absorbed in or permeates the substrate or the layer (b) or transmits the layer (b) and is volatilized, the particle (a2) is not exposed to the air interface to the extent that the curable compound (a1) is polymerized and cured in the level in which at least the aggregation of the particle (a2) can be prevented.

At this point, since a state in which the particle (a2) is buried in the layer defined by combining the layer (a) and the layer (b) is maintained, the aggregation of the particle (a2) is suppressed and the moth eye structure can be formed.

In a case where the state in which the particle (a2) is buried in the layer (b) is maintained until the process reaches the following step (3), the maintaining operation is not necessary.

In a case where the burying state cannot be maintained due to the volatilization of components of the layer (b) or the layer (a) or the permeation thereof into the substrate (a functional layer, in a case where the substrate has a functional layer) or the like after the coating with the layer (b), an operation such as causing the component of the layer (b) to be thick in advance can be performed.

As a mechanism of suppressing the particle aggregation by maintaining the state in which the particle (a2) is not exposed on the surface of the layer (b), it is known that large attractive force derived from surface tension, so-called lateral capillary force, works in a case where the particle protrudes from the layer surface to the air, and it is assumed that the attractive force can be reduced by burying the particle by the layer (b).

In the step (1), it is preferable that the particle (a2) does not exist in a direction orthogonal to the surface of the substrate. Here, the expression "the particle (a2) does not exist in the direction orthogonal to the surface of the substrate" indicates that, in a case where 10 μm×10 μm of the in-plane of the substrate is observed with three visual fields with a scanning electron microscope (SEM), the ratio of the number of particles (a2) in a state in which a plurality of the particles exist in the direction orthogonal to the surface is 80% or greater and preferably 95% or greater.

In steps (1) and (2), the total film thickness of the film thickness of a portion of the layer (a) in which the particle (a2) does not exist, and the film thickness of the layer (b) is preferably greater than the average primary particle diameter of the particle (a2). In a case where the layer (a) and the layer (b) are provided on the substrate by coating, the total film thickness of the film thickness of a portion of the layer (a) in which the particle (a2) does not exist and the film thickness of the layer (b) is greater than the average primary particle diameter of the particle (a2) by preferably 0.01 μm to 10 μm, more preferably 0.01 μm to 2 μm, and even more preferably 0.01 μm to 1 μm.

In a case where the laminate obtained by forming the layer (b) on the temporary support is provided by being laminated to the layer (a), the total film thickness of the film thickness in the portion of the layer (a) in which the particle (a2) does not exist and the film thickness of the layer (b) is greater than the average primary particle diameter of the particle (a2) by preferably 0.1 μm to 50 μm and more preferably 1 μm to 30 μm.

In a case where the total film thickness of the film thickness of the portion of the layer (a) in which the particle (a2) does not exist and the film thickness of the layer (b) is greater than the average primary particle diameter of the particle (a2), the particle (a2) is hardly exposed on the surface of the layer (b), and thus the total film thickness is preferable.

As the film thickness of the portion of the layer (a) in which the particle (a2) does not exist, an average value obtained by curing the layer (a), observing a cross section of the coating film with a scanning electron microscope (SEM), and measuring the film thicknesses of 100 arbitrary points can be used.

(Substrate)

The substrate is not particularly limited, as long as the substrate is a substrate having light transmittance that is generally used as a substrate of an antireflection film, but a plastic substrate or a glass substrate is preferable.

As the plastic substrate, various kinds thereof may be used. Examples thereof include a substrate containing a cellulose resin; cellulose acylate (triacetate cellulose, diacetyl cellulose, and acetate butyrate cellulose) and the like; a polyester resin; polyethylene terephthalate and the like, a (meth)acrylic resin, a polyurethane-based resin, polycarbonate, polystyrene, an olefin-based resin, and the like. A substrate containing cellulose acylate, polyethylene terephthalate, or a (meth)acrylic resin is preferable, a substrate containing cellulose acylate is more preferable, and a cellulose acylate film is particularly preferable. As cellulose acylate, substrates disclosed in JP2012-093723A and the like can be preferably used.

The thickness of the plastic substrate is usually about 10 μm to 1,000 μm. However, in view of satisfactory handleability, high light transmittance, and sufficient strength, the thickness is preferably 20 μm to 200 μm and more preferably 25 μm to 100 μm. As the light transmittance of the plastic substrate, those having light transmittance of the visible light of 90% or greater are preferable.

According to the present invention, before the step (1), a functional layer may be provided on the substrate. In a case where a functional layer is provided on the substrate, a laminate of the functional layer and the substrate is called a "substrate". In a case where a functional layer is provided on the substrate, the layer (a) is provided on the functional layer in the step (1) and subsequent steps are performed. As the functional layer, a hard coat layer is preferable.

(Layer (a))

The layer (a) includes the curable compound (a1) and the particle (a2) having an average primary particle diameter of 100 nm to 380 nm.

The layer (a) is a layer for forming an antireflection layer in the antireflection film (also referred to as a "completed antireflection film") manufactured by the manufacturing method of the present invention.

The curable compound (a1) included in the layer (a) becomes a binder resin of the antireflection layer in the completed antireflection film.

The particle (a2) having an average primary particle diameter of 100 nm to 380 nm included in the layer (a) is a particle protruding from the surface of the film consisting of the binder resin in the completed antireflection film and having a moth eye structure consisting of an uneven shape.

The layer (a) is cured in the step (2), and thus components contained before curing and after curing are different, but according to the present invention, for convenience, the layer (a) is referred to as the layer (a) at any stage.

<Curable Compound (a1)>

The curable compound (a1) is preferably a compound (preferably an ionizing radiation curable compound) having a polymerizable functional group. As the compound having a polymerizable functional group, various monomers, oligomers, and polymers can be used. As the polymerizable functional group (polymerizable group), photopolymerizable, electron beam polymerizable, or radiation polymerizable groups are preferable. Among the groups, photopolymerizable functional group is preferable.

Examples of the photopolymerizable functional group include a polymerizable unsaturated group (carbon-carbon unsaturated double bond group) such as a (meth)acryloyl group, a vinyl group, a styryl group, and an allyl group. Among the groups, a (meth)acryloyl group is preferable.

Specific examples of the compound having a polymerizable unsaturated group include (meth)acrylic acid diesters of alkylene glycol such as neopentyl glycol acrylate, 1,6-hexanediol (meth)acrylate, and propylene glycol di(meth) acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol such as pentaerythritol di(meth)acrylate; and (meth)acrylic acid diesters of an ethylene oxide or propylene oxide adduct such as 2,2-bis{4-(acryloxy-diethoxy) phenyl}propane, and 2-2-bis{4-(acryloxy-polypropoxy) phenyl}propane.

Epoxy (meth)acrylates, urethane (meth)acrylates, and polyester (meth)acrylates are also preferably used as a photopolymerizable monomer.

Among these, esters of polyhydric alcohol and (meth) acrylic acid are preferable. It is more preferable to contain at least one polyfunctional monomer having three or more (meth)acryloyl groups in one molecule.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphate tri(meth)acrylate, trimethylol ethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa (meth)acrylate, 1,2,3-cyclohexane tetramethacrylate, polyurethane polyacrylate, polyester polyacrylate, and caprolactone-modified tris(acryloxyethyl) isocyanurate.

Specific examples of the polyfunctional acrylate-based compound having a (meth)acryloyl group include esterification products of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, KAYARAD GPO-303 manufactured by Nippon Kayaku Co., Ltd., and V #3PA, V #400, V #36095D, V #1000, and V #1080 manufactured by Osaka Organic Chemical Industry Ltd. A trifunctional or higher functional urethane acrylate compound such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, SHIKOH UV-2750B (manufactured by Nippon Synthetic Chem Industry Co., Ltd.), UL-503LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4858 (manufactured by Daicel-UCB Corporation), HIGH-COAP AU-2010 and UNIDIC AU-2020 (manufactured by Tokushiki Co., Ltd.), ARONIX M-1960 (manufactured by Toagosei Co., Ltd.), and ARTRESIN UN-3320HA, UN-3320HC, UN-3320HS, UN-904, HDP-4T, and U15HA (manufactured by Shin-Nakamura Chemical Co., Ltd.) and a trifunctional or higher functional polyester compound such as ARONIX M-8100, M-8030, and M-9050 (manufactured by Toagosei Co., Ltd.), and KRM-8307 (manufactured by Daicel Cytec Co., Ltd.) can be suitably used. Particularly, DPHA and PET-30 are preferably used.

Examples thereof include a resin having three or more polymerizable functional groups, for example, a polyester resin having a relatively low molecular weight, a polyether resin, an acrylic resin, an epoxy resin, an urethane resin, an alkyd resin, a spiroacetal resin, a polybutadiene resin, and a polythiol polyene resin, or an oligomer or a prepolymer of a polyfunctional compound such as polyhydric alcohol.

Compounds disclosed in JP2005-76005A and JP2005-36105A, dendrimers such as SIRIUS-501 and SUBARU-501 (manufactured by Osaka Organic Chemical Industry Ltd.), and norbornene ring-containing monomers disclosed in JP2005-60425A can be used.

Two or more types of the compounds having a polymerizable functional group may be used in combination. The polymerization of these compounds having a polymerizable functional group can be performed by irradiation with ionizing radiation or heating under the presence of a photoradical initiator or a thermal radical initiator.

The curable compound (a1) preferably includes at least one of the compounds having a (meth)acryloyl group having an SP value of 20 to 25, in view of permeation properties to the substrate. The SP value of the compound having a (meth)acryloyl group is preferably within ±4 and more preferably ±2 with respect to the SP value of the surface of the substrate.

The SP value (solubility parameter) according to the present invention is a value calculated by a Hoy method, and the Hoy method is disclosed in Polymer Handbook Fourth Edition.

In view of easy permeation to a plastic substrate or a hard coat layer, as the curable compound (a1), a compound having two or less polymerizable functional groups in one molecule may be used. Particularly, it is preferable that the compound having three or more polymerizable functional groups in one molecule and a compound having two or more polymerizable functional groups in one molecule or a compound not having a polymerizable functional group are used in combination.

The compound having two or more polymerizable functional groups in one molecule or a compound not having a polymerizable functional group is preferably a compound in which a weight-average molecular weight Mwa is $40<Mwa<500$ and an SP value Spa by the Hoy method is $19<SPa<24.5$. The compound having the molecular weight and the SP value is a compound that can easily permeate a plastic substrate (particularly, a cellulose acylate substrate) or a functional layer such as a hard coat layer and that is preferable for forming a permeation layer between the plastic substrate or a functional layer such as a hard coat layer and an antireflection layer. Since the number of the polymerizable functional groups is two or less or the polymerizable group is not included, constriction in a case of curing is small, and curing is not performed even in a case where the compound permeates the plastic substrate and cured.

The number of polymerizable functional groups in one molecule of the compound having two or less polymerizable functional groups in one molecule or the compound not having the polymerizable functional group is preferably 0 to 2 and more preferably 0 to 1.

The weight-average molecular weight and the number-average molecular weight according to the present invention are values measured in the following conditions by the gel permeation chromatography (GPC).
[Solvent] Tetrahydrofuran
[Name of device] TOSOH HLC-8220GPC
[Column] Three items of TOSOH TSKgel Super HZM-H (4.6 mm×15 cm) are continuously used.
[Column temperature] 25° C.
[Sample concentration] 0.1 mass %
[Flow rate] 0.35 ml/min
[Calibration Curve] A calibration curve with seven samples of TSK standard polystyrene manufactured by TOSOH Corporation Mw-2,800,000 to 1,050 is used.

The coating amount of the curable compound (a1) included in the layer (a) is preferably 100 mg/m² to 800 mg/m², more preferably 100 mg/m² to 600 mg/m², and most preferably 100 mg/m² to 400 mg/m².

<Particle (a2) Having Average Primary Particle Diameter of 100 nm to 380 nm>

The particle (a2) having an average primary particle diameter of 100 nm to 380 nm is referred to as the "particle (a2)".

Examples of the particle (a2) include a metal oxide particle, a resin particle, and an organic-inorganic hybrid particle having a core of a metal oxide particle and a shell of a resin. In view of excellent film hardness, the metal oxide particle is preferable.

Examples of the metal oxide particle include a silica particle, a titania particle, a zirconia particle, and an antimony pentoxide particle. Since the refractive index is close to many binders, haze is hardly generated and the moth eye structure is easily formed. Therefore, a silica particle is preferable.

Examples of the resin particle include a polymethyl methacrylate particle, a polystyrene particle, and a melamine particle.

In view of forming a moth eye structure by arranging particles side by side, the average primary particle diameter of the particle (a2) is 100 nm to 380 nm, preferably 100 nm to 300 nm, more preferably 150 nm to 250 nm, and even more preferably 170 nm to 220 nm.

Only one kind of the particle (a2) may be used singly, or two or more kinds of particles having different average primary particle diameters may be used.

The average primary particle diameter of the particle refers to the cumulative 50% particle diameter of the volume-average particle diameter. In the measurement of the particle diameter, a scanning electron microscope (SEM) can be used. A powder particle (in a case of a dispersion liquid, ones obtained by drying a solvent is volatilized by drying) is observed at the appropriate magnification (about 5,000 times) by SEM observation, the diameter of each of 100 primary particles is measured, the volume thereof is calculated, and the cumulative 50% particle diameter can be taken as the average primary particle diameter. In a case where the particle is not spherical, the average value of the long diameter and the short diameter is regarded as the diameter of the primary particle. In a case where the particle contained in the antireflection film is measured, it is calculated by observing the antireflection film from the front surface side by SEM in the same manner as described above. In this case, for easier observation, carbon vapor deposition, an etching treatment, and the like may be suitably applied to the sample.

The shape of the particle is most preferably a spherical shape, but may be a shape other than a spherical shape such as an amorphous shape.

The silica particle may be crystalline or amorphous.

As the particle, surface-treated inorganic fine particle is preferably used for improving the dispersibility in the coating liquid, improving the film hardness, and preventing aggregation. Specific examples and preferable examples of the surface treatment method are the same as those described in [0119] to [0147] of JP2007-298974A.

Particularly, in view of providing the binding properties to the binder component and improving the film hardness, it is preferable that the surface of the particle is surface-modified with a compound having a functional group having reactivity with an unsaturated double bond and the particle surface, and an unsaturated double bond is applied to the particle surface.

As the specific examples of the particle having an average primary particle diameter of 100 nm to 380 nm, SEAHOSTAR KE-P10 (average primary particle diameter 150 nm, amorphous silica manufactured by Nippon Shokubai Co., Ltd.), SEAHOSTAR KE-P30 (average primary particle diameter 300 nm, amorphous silica manufactured by Nippon Shokubai Co., Ltd.), SEAHOSTAR KE-S30 (average primary particle diameter 300 nm, heat resistance 1,000° C., calcined silica manufactured by Nippon Shokubai Co., Ltd.), EPOSTAR S (average primary particle diameter 200 nm, melamine.formaldehyde condensate manufactured by Nippon Shokubai Co., Ltd.), EPOSTAR MA-MX100W (average primary particle diameter 175 nm, polymethyl methacrylate (PMMA)-based crosslinked product manufactured by Nippon Shokubai Co., Ltd.), EPOSTAR MA-MX200W (average primary particle diameter 350 nm, polymethyl methacrylate (PMMA)-based crosslinked product manufactured by Nippon Shokubai Co., Ltd.), STAPHYLOID (a multilayer structure organic fine particle manufactured by Aica Kogyo Co., Ltd.), and GANZPEARL (polymethyl methacrylate, polystyrene particle manufactured by Aica Kogyo Co., Ltd.) can be preferably used.

Since the amount of hydroxyl groups on the surface is moderately large and the particle is hard, the particle (a2) is particularly preferably a calcined silica particle.

The calcined silica particle can be manufactured by a well-known technique of hydrolyzing and condensing a hydrolyzable silicon compound in an organic solvent including water and a catalyst to obtain a silica particle and calcining the silica particle, and, for example, JP2003-176121A and JP2008-137854A can be referred to.

The silicon compound as a raw material for manufacturing the calcined silica particle is not particularly limited, and examples thereof include a chlorosilane compound such as tetrachlorosilane, methyltrichlorosilane, phenyltrichlorosilane, dimethyldichlorosilane, diphenyldichlorosilane, methyl vinyl dichlorosilane, trimethylchlorosilane, and methyl diphenylchlorosilane; an alkoxysilane compound such as tetramethoxysilane, tetraethoxysilane, tetraisopropoxysilane, tetrabutoxysilane, methyltrimethoxysilane, methyltriethoxysilane, trimethoxyvinylsilane, triethoxyvinylsilane, 3-glycidoxypropyltrimethoxysilane, 3-chloropropyltrimethoxysilane, 3-mercaptopropyltrimethoxysilane, 3-(2-aminoethylamino) propyltrimethoxysilane, phenyltrimethoxysilane, phenyltriethoxysilane, dimethyl dimethoxysilane, dimethyl diethoxysilane, 3-glycidoxypropylmethyldimethoxysilane, 3-glycidoxypropylmethyldiethoxysilane, 3-chloropropylmethyldimethoxysilane, diphenyldimethoxysilane, diphenyldiethoxysilane, dimethoxydiethoxysilane, trimethylmethoxysilane, and trimethylethoxysilane; an acyloxysilane compound such as tetraacetoxysilane, methyl triacetoxysilane, phenyl triacetoxysilane, dimethyl diacetoxysilane, diphenyl diacetoxysilane, and trimethylacetoxysilane; and a silanol compound such as dimethylsilanediol, diphenylsilanediol, and trimethylsilanol. Among the exemplary silane compounds, an alkoxysilane compound is particularly preferable, since alkoxysilane compound can be obtained more easily and halogen atoms as impurities in the obtained calcined silica particle are not included. As a preferred embodiment of the calcined silica particle according to the present invention, it is preferable that the content of halogen atoms is substantially 0%, and halogen atoms are not detected.

The calcining temperature is not particularly limited, but is preferably 800° C. to 1,300° C. and more preferably 1,000° C. to 1,200° C.

The coating amount of the particle (a2) included in the layer (a) is preferably 50 mg/m$^2$ to 200 mg/m$^2$, more preferably 100 mg/m$^2$ to 180 mg/m$^2$, and most preferably 130 mg/m$^2$ to 170 mg/m$^2$. In a case where the coating amount is the lower limit or greater, a large number of protrusions of the moth eye structure can be formed, and thus the antireflection properties are more easily improved. In a case where the coating amount is the upper limit or less, aggregation in the liquid hardly occurs and a satisfactory moth eye structure is easily formed.

It is preferable that only one kind of the monodispersed silica particle having an average primary particle diameter of 100 nm to 380 nm and or less and having a Cv value of less than 5% is contained, since the height of the unevenness of the moth eye structure becomes homogeneous and the reflectivity is further decreased. The Cv value is usually measured using a laser diffraction type particle diameter measuring apparatus. However, other particle size measuring methods may be used, or the Cv value can be calculated by obtaining particle diameter distribution by image analysis from a surface SEM image of the antireflection layer of the present invention. The Cv value is more preferably less than 3%.

The layer (a) may contain components in addition to the curable compound (a1) and the particle (a2), and examples thereof include a solvent, a polymerization initiator, a dispersing agent of the particle (a2), a leveling agent, and an antifouling agent.

<Solvent>

In view of improving the dispersibility, it is preferable to select a solvent having a polarity close to that of the particle (a2). Specifically, for example, in a case where the particle (a2) is a metal oxide particle, an alcohol-based solvent is preferable, and examples thereof include methanol, ethanol, 2-propanol, 1-propanol, and butanol. For example, in a case where the particle (a2) is a metal resin particle subjected to hydrophobic surface modification, ketone-based, ester-based, carbonate-based, alkane, aromatic solvents, and the like are preferable, and examples thereof include methyl ethyl ketone (MEK), dimethyl carbonate, methyl acetate, acetone, methylene chloride, and cyclohexanone. A plurality of these solvents may be mixed to be used without remarkably deteriorating the dispersibility.

<Dispersing Agent of Particle (a2)>

The dispersing agent of the particle (a2) lowers the cohesive force between the particles such that the particle (a2) is uniformly arranged. The dispersing agent is not particularly limited, but an anionic compound such as sulfuric acid salt and phosphoric acid salt, a cationic compound such as aliphatic amine salt and quaternary ammonium salt, a nonionic compound, and a polymer compound are preferable, and a polymer compound is more preferable since the polymer compound has a high degree of freedom in selecting adsorptive groups and steric repulsive groups. As the dispersing agent, a commercially available product may be used. Examples thereof include DISPERBYK160, DISPERBYK161, DISPERBYK162, DISPERBYK163, DISPERBYK164, DISPERBYK166, DISPERBYK167, DISPERBYK171, DISPERBYK180, DISPERBYK182, DISPERBYK2000, DISPERBYK2001, DISPERBYK2164, Bykumen, BYK-2009, BYK-P104, BYK-P104S, BYK-220S, Anti-Terra203, Anti-Terra204, and Anti-Terra205 (all are product names) manufactured by BYK Japan KK.

<Leveling Agent>

The leveling agent lowers the surface tension of the layer (a), such that the liquid after coating is stabilized and the curable compound (a1) and the particle (a2) are easily arranged in a uniform manner. For example, compounds disclosed in JP2004-331812A and JP 2004-163610A can be used.

<Antifouling Agent>

The antifouling agent provides water and oil repelling properties to the moth eye structure, such that adhesion of dirt and fingerprints can be suppressed. For example, compounds disclosed in JP2012-88699A can be used.

<Polymerization Initiator>

A polymerization initiator may be used in the layer (a).

In a case where the curable compound (a1) is a photopolymerizable compound, it is preferable to include a photopolymerization initiator.

Examples of the photopolymerization initiator include acetophenones, benzoins, benzophenones, phosphine oxides, ketals, anthraquinones, thioxanthones, an azo compound, peroxides, 2,3-dialkyldione compounds, disulfide compounds, fluoroamine compounds, aromatic sulfoniums, lophine dimers, onium salts, borate salts, active esters, active halogens, an inorganic complex, and coumarins. Specific examples, preferable embodiments, commercially available products and the like of the photopolymerization initiator are disclosed in paragraphs [0133] to [0151] of JP2009-098658A, and can be suitably used in the present invention in the same manner.

Various examples are provided in "Newest UV curing technology" {Technical Information Institute Co. Ltd.} (1991), page 159 and "Ultraviolet Curing System" written by Kiyomi KATO) (published in 1989 by The integrated Technology Center), pages 65 to 148, and are useful for the present invention.

The content of the polymerization initiator in the layer (a) is an amount sufficient for polymerizing the polymerizable compound included in the layer (a) and is preferably 0.5 to 8 mass % and more preferably 1 to 5 mass % with respect to the total solid content in the layer (a) such that the starting point does not excessively increase.

(Layer (b))

The layer (b) includes the compound (b1) incompatible with the curable compound (a1).

The layer (b) is provided for causing the particle (a2) of the layer (a) not to aggregate before the curable compound (a1) is cured and is removed after the curable compound (a1) is cured. Therefore, the compound (b1) is required to be incompatible with the curable compound (a1).

The expression "the compound (b1) is required to be incompatible with the curable compound (a1)" means that an insoluble matter remains in a case where the compound (b1) is mixed and stirred at 25° C. in an amount of 5 mass % with respect to the curable compound (a1).

The compound (b1) is preferably a compound which is not cured by heat. It is preferable that the compound (b1) is a compound which is not cured by heat, since, even in a case where a heating process is included before the compound (b1) is removed in the manufacturing method of the present invention, the moth eye structure can be easily formed with the particle (a2).

In the case where the layer (b) is provided as the compound (b1) by coating, it is preferable that the compound (b1) is a liquid oily component at 50° C. and is more preferably a silicone-based oily component, a hydrocarbon-based oily component, an ester-based oily component, a natural animal and vegetable oils and fats, semisynthetic oils and fats, higher fatty acid, higher alcohols, or a fluorine-based oily component.

[Silicone-Based Oily Component]

The silicone-based oily component may be any one of a solid shape, a semisolid shape, and a liquid shape. As the silicone-based oily component, for example, silicone oil, a silicone-based surfactant, a silicone resin, a silicone wax, and a silicone-based gelling agent can be used.

Examples of the silicone oil include low viscosity to high viscosity linear or branched organopolysiloxane such as dimethyl polysiloxane (for example, KF96 series manufactured by Shin-Etsu Chemical Co., Ltd.), tristrimethylsiloxymethylsilane, capryllyl methicone, phenyl trimethicone, tetrakistrimethylsiloxysilane, methylphenyl polysiloxane, methylhexyl polysiloxane, methyl hydrogen polysiloxane, and a dimethylsiloxane.methylphenylsiloxane copolymer; cyclic organopolysiloxane such as octamethyl cyclotetrasiloxane, decamethyl cyclopentasiloxane, dodecamethyl cyclohexasiloxane, tetramethyl tetrahydrogen cyclotetrasiloxane, and tetramethyl tetraphenyl cyclotetrasiloxane; silicone rubber such as amino-modified organopolysiloxane; pyrrolidone-modified organopolysiloxane; pyrrolidone carboxylic acid-modified organopolysiloxane; a gum-like dimethylpolysiloxane having a high degree of polymerization, gum-like amino-modified organopolysiloxane, and a gum-like dimethylsiloxane.methylphenylsiloxane copolymer; silicone gum or a rubber cyclic organopolysiloxane solution; trimethylsiloxysilicic acid, a cyclic siloxane solution of trimethylsiloxysilicic acid (for example, KF-7312J manufactured by Shin-Etsu Chemical Co., Ltd.); higher alkoxy-modified silicone such as stearoquilene; higher fatty acid-modified silicone; alkyl modified silicone; long chain alkyl modified silicone; amino acid-modified silicone; fluorine-modified silicone; and a solution of a silicone resin.

Examples of the silicone-based surfactant include linear or branched polyoxyethylene-modified organopolysiloxane, linear or branched polyoxyethylene polyoxypropylene-modified organopolysiloxane, linear or branched polyoxyethylene-alkyl co-modified organopolysiloxane, linear or branched polyoxyethylene polyoxypropylene-alkyl co-modified organopolysiloxane, linear or branched polyglycerin-modified organopolysiloxane, and linear or branched polyglycerol.alkyl co-modified organopolysiloxane (for example, silicone-based surfactants manufactured by Shin-Etsu Chemical Co., Ltd.: KF-6011, 6043, 6028, 6038, 6100, 6104, and 6105). The silicone-based surfactant may be used in a state of coexisting with other oily components such as polyoxyethylene-modified partially crosslinked organopolysiloxane, and polyglycerin-modified partially crosslinked polydiorganosiloxane (for example, manufactured by Shin-Etsu Chemical Co., Ltd., KSG series: KSG-210, 710, 310, 320, 330, 340, 320Z, 350Z, 810, 820, 830, 840, 820Z, and 850Z).

Examples of the silicone resin include an acrylic silicone consisting of an acryl/silicone graft copolymer, an acryl/silicone block copolymer, and the like (specific examples thereof include: a cyclic organopolysiloxane solution of an acryl/silicone graft copolymer: KP-545 manufactured by Shin-Etsu Chemical Co., Ltd.). An acrylic silicone resin containing at least one selected from a pyrrolidone portion, a long chain alkyl portion, a polyoxyalkylene portion, and a fluoroalkyl portion, and an anion portion such as carboxylic acid in a molecule can also be used. The silicone resin is preferably a silicone mesh-shaped compound consisting of at least one of a resin composed of a $R^8_3SiO_{0.5}$ unit and a $SiO_2$ unit, a resin composed of a $R^8_3SiO_{0.5}$ unit, a $R^8_2SiO$ unit, and a $SiO_2$ unit, a resin composed of a $R^8_3SiO_{0.5}$ unit and a $R^8SiO_{0.5}$ unit, a resin composed of a $R^8_3SiO_{0.5}$ unit, a $R^8_2SiO$ unit, and a $R^8SiO_{1.5}$ unit, or a resin composed of a $R^8_3SiO_{0.5}$ unit, a $R^8_2SiO$ unit, a $R^8SiO_{1.5}$ unit, and a $SiO_2$ unit. $R^8$ in the formula is a substituted or unsubstituted monovalent hydrocarbon group having 1 to 30 carbon atoms. A silicone mesh-shaped compound containing at least one selected from a pyrrolidone portion, a long chain alkyl portion, a polyoxyalkylene portion, a polyglycerol portion, a fluoroalkyl portion, and an amino portion in a molecule can be used.

Examples of the silicone wax include an acrylic silicone wax consisting of an acryl/silicone graft copolymer, an acryl/silicone block copolymer, and the like (specific examples thereof include: a cyclic organopolysiloxane solution of an acryl/silicone graft copolymer: KP-561P and 562P manufactured by Shin-Etsu Chemical Co., Ltd.). An acrylic silicone wax containing at least one selected from a pyrrolidone portion, a long chain alkyl portion, a polyoxyalkylene portion, and a fluoroalkyl portion, and an anion portion such as carboxylic acid in a molecule can also be used. The silicone wax is preferably polylactone-modified polysiloxane bonding a polylactone which is a ring-opening polymer of a five or more-membered lactone compound. This silicone wax is a silicone-modified olefin wax obtained by performing addition reaction of an olefin wax having an unsaturated group consisting of α-olefin and diene with organohydrogenpolysiloxane having one or more Sill bonds in one molecule. The above α-olefin is preferably α-olefin having 2 to 12 carbon atoms such as ethylene, propylene, 1-butene, 1-hexene, 4-methyl-1-pentene, and the above diene is preferably butadiene, isoprene, 1,4-hexadiene, vinyl norbornene, ethylidene norbornene, and dicyclopentadiene. As the organohydrogenpolysiloxane having Sill bonds, organohydrogenpolysiloxane having a linear structure, organohydrogenpolysiloxane having a siloxane branched structure, and the like can be used.

Examples of the silicone-based gelling agent include unmodified or modified partial portions include a gel mixture including a gelling component such as an unmodified or modified partially crosslinked organopolysiloxane such as unmodified partially crosslinked organopolysiloxane, alkyl-modified partially crosslinked organo polysiloxane, and silicone branched alkyl modified partially crosslinked organo polysiloxane and various oily components such as cyclopentasiloxane, dimethicone, mineral oil, isododecane, trioctanoin, and squalane. In the gel mixture, the gelling component and the oily component are contained in a coexisting manner. Examples of the gel mixture include KSG series (product name) manufactured by Shin-Etsu Chemical Co., Ltd., particularly, KSG-15, 16, 41, 42, 43, 44, 042Z, and 045Z (all product names).

Examples of the hydrocarbon-based oily component include liquid paraffin, light liquid isoparaffin, heavy flow isoparaffin, vaseline, n-paraffin, isoparaffin, isododecane, isohexadecane, polyisobutylene, hydrogenated polyisobutylene, polybutene, ozokerite, ceresin, microcrystalline wax, paraffin wax, polyethylene wax, polyethylene-polypropylene wax, squalane, squalene, pristane, polyisoprene, and wax.

Examples of the ester-based oily component include hexyldecyl octanoate, cetyl octanoate, isopropyl myristate, isopropyl palmitate, butyl stearate, hexyl laurate, myristyl myristate, oleyl oleate, decyl oleate, octyldodecyl myristate, hexyldecyl dimethyloctanoate, cetyl lactate, myristyl lactate, diethyl phthalate, dibutyl phthalate, lanolin acetate, ethylene glycol monostearate, propylene glycol monostearate, propylene glycol dioleate, glyceryl monostearate, glyceryl monooleate, glyceryl tri-2-ethylhexanoate, trimethylolpropane tri-2-ethylhexanoate, ditrimethylolpropane triethylhexanoate, (isostearic acid/sebacic acid) ditrimethylolpropane, trimethylolpropane trioctanoate, trimethylolpropane triisostearate, diisopropyl adipate, diisobutyl adipate, 2-hexyldecyl adipate, di-2-heptylundecyl adipate, diisostearyl malate, monoisostearic acid hydrogenated castor oil, N-alkyl glycol monoisostearate, octyldodecyl isostearate, isopropyl isostearate, isocetyl isostearate, ethylene glycol di-2-ethylhexanoate, cetyl 2-ethylhexanoate, pentaerythritol tetra-2-ethylhexanoate, octyl dodecyl gum ester, ethyl oleate, octyldodecyl oleate, neopentyl glycol dicaprate, triethyl citrate, 2-ethylhexyl succinate, dioctyl succinate, isocetyl stearate, diisopropyl sebacate, di-2-ethylhexyl sebacate, diethyl sebacate, dioctyl sebacate, dibutyl octyl sebacate, cetyl palmitate, octyldodecyl palmitate, octyl palmitate, 2-ethylhexyl palmitate, 2-hexyldecyl palmitate, 2-heptylundecyl palmitate, cholesteryl 12-hydroxystearate, dipentaerythritol fatty acid ester, 2-hexyldecyl myristate, ethyl laurate, N-lauroyl-L-glutamic acid 2-octyldodecyl ester, N-lauroyl-L-glutamic acid di(cholesteryl/behenyl/octyldodecyl), N-lauroyl-L-glutamic acid di(cholesteryl/octyldodecyl), N-lauroyl-L-glutamic acid di(phytosteryl/behenyl/octyldodecyl), N-lauroyl-L-glutamic acid di(phytosteryl/octyldodecyl), N-lauroylsarcosine isopropyl, diisostearyl malate, neopentyl glycol dioctanoate, isodecyl neopentanoate, isotridecyl neopentanoate, isostearyl neopentanoate, isononyl isononanoate, isotridecyl isononanoate, octyl isononanoate, isotridecyl isononanoate, diene pentane diene pentane diol, dineopentanoic acid methyl pentanediol, octyldodecyl neodecanoate, 2-butyl-2-ethyl-1,3-propanediol dioctanoate, pentaerythrityl tetraoctanoate, hydrogenated rosin pentaerythrityl, pentaerythrityl triethylhexanoate, (hydroxystearic acid/stearic acid/rosin acid) dipentaerythrityl, polyglyceryl tetraisostearate, nona isostearic acid polyglyceryl-10, deca(erucic acid/isostearic acid/ricinoleic acid) polyglyceryl-8, (hexyldecanoic acid/sebacic acid) diglyceryl oligoester, glycol distearate (ethylene glycol distearate), diisopropyl dimer dilinoleate, diisomer linoleic acid diisostearyl, die merge reel acid di(isostearyl/phytosteryl), die merge linoleic acid (phytosteryl/behenyl), die merge linoleic acid (phytosteryl/isostearyl/cetyl/stearyl/behenyl), die merge linoleic acid die merge linoleyl, diisostearic acid dimer rinoleyl, die merge linoleyl hydrogenated rosin condensate, die merge linoleic acid hydrogenated castor oil, hydroxyalkyl dimer linoleyl ether, glyceryl triisooctanoate, glyceryl triisostearate, glyceryl trimyristate, glyceryl triisopalmitate, glyceryl trioctanoate, glyceryl trioleate, glyceryl diisostearate, tri(caprylic/capric acid) glyceryl, tri(caprylic/capric/myristic/stearic) glyceryl, hydrogenated rosin triglyceride (hydrogenated ester gum), rosin triglyceride (ester gum), glyceryl behenate eicosane diacid, glyceryl di-2-heptylundecanoate, diglyceryl myristate isostearate, cholesteryl acetate, cholesteryl nonanoate, cholesteryl stearate, cholesteryl isostearate, cholesteryl oleate, cholesteryl 12-hydroxystearate, macadamia nut oil fatty acid cholesteryl, macadamia nut oil fatty acid phytosteryl, phytosteryl isostearate, soft lanolin fatty acid cholesteryl, hard lanolin fatty acid cholesteryl, long chain branched fatty acid cholesteryl, long chain α-hydroxy fatty acid cholesteryl, octyldodecyl ricinoleate, lanolin fatty acid octyldodecyl, octyldodecyl erucate, isostearic acid hydrogenated castor oil, avocado oil fatty acid ethyl, and lanolin fatty acid isopropyl.

Examples of the natural animal and vegetable fats and oils and semisynthetic fats and oils include avocado oil, linseed oil, almond oil, ibotarou, eno oil, olive oil, cocoa butter, kapok row, kaya oil, carnauba wax, liver oil, candelilla wax, beef tallow, beef leg fat, beef bone fat, hardened beef tallow, kyunin oil, spermaceti, hydrogenated oil, wheat germ oil, sesame oil, rice germ oil, rice bran oil, sugarcane wax, sasanqua oil, safflower oil, shea butter, synergist oil, cinnamon oil, jojo barrow, olive squalane, shellac wax, turtle oil, soybean oil, tea seed oil, camellia oil, evening primrose oil, corn oil, lard, rapeseed oil, Japanese tung oil, nukaro, germ oil, horse fat, persic oil, palm oil, palm kernel oil, castor oil, hydrogenated castor oil, castor oil fatty acid methyl ester, sunflower oil, grape oil, bayberry row, jojoba oil, hydrogenated jojoba ester, macadamia nut oil, beeswax, mink oil, cotton seed oil, cotton wax, Japan wax, Japan wax kernel oil, montan wax, coconut oil, hardened coconut oil, tri-coconut oil fatty acid glyceride, tamba, peanut oil, lanolin, liquid lanolin, reduced lanolin, lanolin alcohol, hard lanolin, lanolin acetate, lanolin fatty acid isopropyl, polyoxyethylene (POE) lanolin alcohol ether, POE lanolin alcohol acetate, lanolin fatty acid polyethylene glycol, POE hydrogenated lanolin alcohol ether, and egg yolk oil.

Examples of the higher fatty acid include lauric acid, myristic acid, palmitic acid, stearic acid, behenic acid, undecylenic acid, oleic acid, linoleic acid, linolenic acid, arachidonic acid, eicosapentaenoic acid (EPA), docosahexaenoic acid (DHA), isostearic acid, and 12-hydroxystearic acid.

Examples of the higher alcohol include lauryl alcohol, myristyl alcohol, palmityl alcohol, stearyl alcohol, behenyl alcohol, hexadecyl alcohol, oleyl alcohol, isostearyl alcohol, hexyl dodecanol, octyldodecanol, cetostearyl alcohol, 2-decyltetradecinol, cholesterol, sitosterol, phytosterol, lanosterol, POE cholesterol ether, monostearyl glycerin ether (batyl alcohol), and monooleyl glyceryl ether (celkyl alcohol).

Examples of the fluorine-based oily component include perfluoropolyether, perfluorodecalin, and perfluorooctane.

In view of suppressing the aggregation of a particle forming a moth eye structure and reducing the muddiness of the antireflection film, the compound (b1) is preferably a liquid at 50° C. and more preferably a liquid at 25° C. At least one of the compounds (b1) preferably has a boiling point of 110° C. or higher. It is preferable that at least one of the compounds (b1) has a boiling point of 110° C. or higher, since it is difficult to volatilize at room temperature and the layer (b) exists until the curing of layer (a) is completed.

In view of the above, the kinematic viscosity at 25° C. of the compound (b1) having a boiling point of 110° C. or higher is preferably 0.1 mm²/s to 100,000 mm²/s, more preferably 0.1 mm²/is to 10,000 mm²/s, and most preferably 0.1 mm²/s to 100 mm²/s.

The difference between the surface tension of the surface of the layer (a) and the surface tension of the compound (b1) having a boiling point of 110° C. or higher is preferably 0 to 15 mN/m, more preferably 0 to 10 mN/m, and most preferably 0 to 5 mN/m. In a case where the surface tension difference is within the above range, the layer (a) can be coated with the layer (b) without repelling, the attractive force acting between the particles can be reduced, and the aggregation of the particle can be suppressed.

(Method for Measuring Surface Tension of Surface of Layer (a))

After the layer (a) is provided under the same conditions as in the step (1), the layer (a) was cured by being irradiated with ultraviolet rays having an illuminance of 200 mW/cm² and an irradiation amount of 300 mJ/cm² by using an air cooling metal halide lamp (manufactured by Eye Graphics Co., Ltd.) of 160 W/cm while purging was performed with nitrogen such that the atmosphere had an oxygen concentration of 0.01 vol % or less without providing the layer (b).

Subsequently, droplets are formed on the layer (a) by using a contact angle meter ["CA-X" type contact angle meter, manufactured by Kyowa Interface Science Co., Ltd.] in a dry state (25° C./65% RH), using pure water as a liquid, forming a droplet of having a diameter of 1.0 mm at the tip of a needle, and bringing the droplet into contact with the surface of the layer (a). In an angle formed by a tangent to the surface of the liquid and the surface of the layer (a) at a point where the layer (a) is in contact with the liquid, an angle on a side including the liquid is measured as a contact angle. The contact angle is measured using methylene iodide instead of pure water as a liquid, so as to obtain the surface free energy from the following formula.

The surface free energy ($\gamma s^v$: unit, mN/m) is defined by the value $\gamma s^v$ ($=\gamma s^d+\gamma s^h$) represented by the sum of $\gamma s^d$ and $\gamma s^h$ obtained by the following simultaneous equations a and b from the respective contact angles $\theta_{H2O}$ and $\theta_{CH2I2}$ of pure water $H_2O$ and iodinated methylene $CH_2I_2$ experimentally obtained on a film with reference to D. K. Owens: J. Appl. Polym. Sci., 13, 1741 (1969).

$$1+\cos \theta_{H2O}=2\sqrt{\gamma s^d}(\sqrt{\gamma_{H2O}^d/\gamma_{H2O}^v})+ 2\sqrt{\gamma s^h}(\sqrt{\gamma_{H2O}^h/\gamma_{H2O}^v}) \quad a$$

$$1+\cos \theta_{CH2I2}=2\sqrt{\gamma s^d}(\sqrt{\gamma_{CH2I2}^d/\gamma_{CH2I2}^v})+ 2\sqrt{\gamma s^h}(\sqrt{\gamma_{CH2I2}^h/\gamma_{CH2I2}^v}) \quad b$$

$\gamma_{H2O}^d=21.8, \gamma_{H2O}^h=51.0, \gamma_{H2O}^v=72.8,$ $\gamma_{CH2I2}^d=49.5, \gamma_{CH2I2}^h=1.3, \gamma_{CH2I2}^v=50.8$ (Method for Measuring Surface Tension of Compound (b1))

The surface tension of the compound (b1) is measured by using an automatic surface tensiometer CBVP-Z type (manufactured by Kyowa Interface Science Co., Ltd.) while the temperature of the sample is kept at 25° C.

In the case where a laminate obtained by forming the layer (b) on the temporary support is laminated to the layer (a), the surface energy of the surface of the layer (b) formed on the temporary support is calculated from the contact angle between pure water and methylene iodide in the same manner as the surface energy measurement of the surface of the layer (a), so as to obtain the surface tension of the compound (b1).

The compound (b1) may be used singly or two or more kinds thereof may be used in combination.

The content of the compound (b1) in the layer (b) is preferably 50 to 100 mass %, more preferably 70 to 100 mass %, even more preferably 90 to 100 mass % with respect to the total mass of the layer (b).

In the present invention, in the step (2), the layer (a) is cured while the state in which the particle (a2) is not exposed on the surface of the layer (b) is maintained. However, it is preferable that the layer (a) has an uneven shape due to the particle (a2) in the stage before the step (2). In this manner, in a case where the layer (b) is removed in the step (3) after the layer (a) is cured in the step (2), it is possible to obtain a state in which the particle (a2) protrudes on the surface of the layer (a).

In the stage before the step (2), in order to cause the layer (a) to have an uneven shape due to the particle (a2), a method of causing a portion of the curable compound (a1) to permeate a substrate (in the case where the substrate has a functional layer such as a hard coat layer or the like, a functional layer thereof) in the step (1-2) to be described below or a method of providing protrusions by adjusting the film thickness of the layer (a) to be shorter than the average primary particle diameter of the particle (a2) in the step (1). In the latter case, in order to prevent a state in which the particle protrudes into the air, a method of providing the layers (a) and (b) by simultaneous overlaying or a method of forming two layers by subjecting the layers (a) and (b) to the layer separation can be used.

As the compound (b1), those having ultraviolet permeability are preferable. It is preferable to have ultraviolet ray permeability in view of manufacturing suitability, since in the step (2), ultraviolet irradiation from the coating layer side can be performed in a case of curing the layer (a).

Specifically, the maximum transmittance at the wavelength of 250 nm to 300 nm in the coating film thickness in the step (2) is preferably 20% or greater, more preferably 40% or greater, and most preferably 60% or greater. It is preferable that the maximum transmittance at 250 nm to 300 nm is 20% or greater, since the layer (a) can be easily cured by being irradiated with ultraviolet rays from the coating layer side.

In a case where the layer (b) is separately provided on the temporary support and laminated to the layer (a), the layer (b) is not particularly limited. However, considering the operation of laminating and peeling, the layer (b) is preferably a solid state (viscoelastic body) viscosity or fluidity and preferably a pressure sensitive adhesive layer.

In this case, any one of the compounds constituting the pressure sensitive adhesive layer acts as the compound (b1).

As the pressure sensitive adhesive component constituting the pressure sensitive adhesive layer, a copolymer composition such as an acrylic copolymer is preferable.

Particularly, a copolymer containing at least one (meth) acrylic acid alkyl ester monomer of an alkyl group having 1 to 14 carbon atoms as a main component is preferable. The weight-average molecular weight of the acrylic copolymer is preferably 200,000 to 2,000,000.

Examples of the (meth)acrylic acid alkyl ester monomer of an alkyl group having 1 to 14 carbon atoms include an alkyl (meth)acrylate monomer such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, heptyl (meth)acrylate, octyl (meth)acrylate, isooctyl (meth)acrylate, 2-ethylhexyl (meth) acrylate, nonyl (meth)acrylate, isononyl (meth)acrylate, decyl (meth)acrylate, cyclopentyl (meth)acrylate, and cyclohexyl (meth)acrylate. The alkyl group of the alkyl (meth) acrylate monomer may be linear, branched, or cyclic. Two or more of the above monomers may be used in combination.

Preferred examples of the (meth)acrylate monomer having an aliphatic ring include cyclopentyl (meth)acrylate, cyclohexyl (meth)acrylate, cycloheptyl (meth)acrylate, and isobornyl (meth)acrylate. Among these, cyclohexyl (meth) acrylate is particularly preferable.

As the copolymer composition of the pressure sensitive adhesive component used in the present invention, the copolymer composition consisting of at least one (meth) acrylic acid alkyl ester monomer of an alkyl group having 1 to 14 carbon atoms and at least one of the other copolymerizable monomers can also be employed. In this case, examples of the other copolymerizable monomer include a copolymerizable vinyl monomer having a vinyl group, a copolymerizable vinyl monomer containing a hydroxyl group, and/or a carboxyl group, and/or an amino group, and an aromatic monomer.

Examples of the copolymerizable vinyl monomer containing a hydroxyl group include hydroxyl group-containing (meth)acrylate esters such as 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, and 8-hydroxyoctyl (meth)acrylate, and hydroxyl group-containing (meth)acrylamides such as N-hydroxy (meth)acrylamide, N-hydroxymethyl (meth) acrylamide, and N-hydroxyethyl (meth)acrylamide, and the copolymerizable vinyl monomer is preferably at least one selected from the group of these compounds.

Examples of the copolymerizable vinyl monomer containing a carboxyl group include (meth)acrylic acid, itaconic acid, crotonic acid, maleic acid, fumaric acid, carboxyethyl (meth)acrylate, and carboxypentyl (meth)acrylate, and at least one selected from the group of these compounds is preferable.

Examples of the copolymerizable vinyl monomer containing an amino group include monoalkylaminoalkyl (meth)acrylate such as monomethylaminoethyl (meth)acrylate, monoethylaminoethyl (meth)acrylate, monomethyl aminopropyl (meth)acrylate, and monoethylaminopropyl (meth)acrylate.

Examples of the aromatic monomer include styrene in addition to aromatic group-containing (meth)acrylate esters such as benzyl (meth)acrylate and phenoxyethyl (meth) acrylate.

Examples of the copolymerizable vinyl monomer other than the above include various vinyl monomers such as acrylamide, acrylonitrile, methyl vinyl ether, ethyl vinyl ether, vinyl acetate, and vinyl chloride.

The composition for forming the pressure sensitive adhesive layer is also referred to as a pressure sensitive adhesive composition.

It is preferable that the pressure sensitive adhesive composition crosslinks the copolymer composition in a case where the pressure sensitive adhesive layer is formed. For crosslinking, the pressure sensitive adhesive composition may contain a known crosslinking agent and may be crosslinked by photocrosslinking such as ultraviolet rays (UV). As the crosslinking agent, one or more crosslinking agents selected from the compound group consisting of a difunctional or higher functional isocyanate-based crosslinking agent, a difunctional or higher functional epoxy-based crosslinking agent, and an aluminum chelate-based crosslinking agent are preferable. In a case where a crosslinking agent is used, the crosslinking agent is preferably contained in an amount of 0.1 to 5 parts by mass with respect to 100 parts by mass of the copolymer composition.

The difunctional or higher functional isocyanate compound may be a polyisocyanate compound having at least two isocyanate (NCO) groups in one molecule, and examples thereof include a burette-modified product and an isocyanurate-modified product of diisocyanates (compounds having two NCO groups in one molecule) such as hexamethylene diisocyanate, isophorone diisocyanate, diphenylmethane diisocyanate, tolylene diisocyanate, and xylylene diisocyanate, and an adduct (polyol modified product) with trivalent or higher valent polyols (compounds having at least three OH groups in one molecule) such as trimethylolpropane and glycerin.

A trifunctional or higher functional isocyanate compound is a polyisocyanate compound having three or more isocyanate (NCO) groups in one molecule, and at least one selected from the compound group consisting of an isocyanurate body of a hexamethylene diisocyanate compound, an isocyanurate body of an isophorone diisocyanate compound, an adduct of hexamethylene diisocyanate compound, an adduct of isophorone diisocyanate compound, a burette body of a hexamethylene diisocyanate compound, and a burette body of an isophorone diisocyanate compound.

The difunctional or higher functional isocyanate-based crosslinking agent is contained in an amount of preferably 0.01 to 5.0 parts by mass and more preferably 0.02 to 3.0 parts by mass, with respect to 100 parts by mass of the acrylic copolymer.

The pressure sensitive adhesive composition may contain an antistatic agent in order to provide antistatic properties. The antistatic agent is preferably an ionic compound and more preferably quaternary onium salt.

As the antistatic agent which is a quaternary onium salt, for example, an alkyldimethylbenzyl ammonium salt having an alkyl group having 8 to 18 carbon atoms, a dialkylmethylbenzyl ammonium salt having an alkyl group having 8 to 18 carbon atoms, a trialkylbenzyl ammonium salt having an alkyl group having 8 to 18 carbon atoms, a tetraalkyl ammonium salt having an alkyl group having 8 to 18 carbon atoms, an alkyldimethylbenzyl phosphonium salt having an alkyl group having 8 to 18 carbon atoms, a dialkylmethylbenzyl phosphonium salt having an alkyl group having 8 to 18 carbon atoms, a trialkylbenzyl phosphonium salt having an alkyl group having 8 to 18 carbon atoms, a tetraalkyl phosphonium salt having an alkyl group having 8 to 18 carbon atoms, an alkyl trimethyl ammonium salt having an alkyl group having 14 to 20 carbon atoms, and an alkyldimethyl ethyl ammonium salt having an alkyl group having 14 to 20 carbon atoms can be used. These alkyl groups may be alkenyl groups having an unsaturated bond.

Examples of the alkyl group having 8 to 18 carbon atoms include an octyl group, a nonyl group, a decyl group, a dodecyl group, a tridecyl group, a tetradecyl group, a pentadecyl group, a hexadecyl group, a heptadecyl group, and an octadecyl group. The alkyl group having 8 to 18 carbon atoms may be a mixed alkyl group derived from natural fats and oils. Examples of the alkenyl group having 8 to 18 carbon atoms include an octenyl group, a nonenyl group, a decenyl group, a dodecenyl group, a tridecenyl group, a tetradecenyl group, a pentadecenyl group, a hexadecenyl group, a heptadecenyl group, an octadecenyl group, an oleyl group, and a linoleyl group.

Examples of the alkyl group having 14 to 20 carbon atoms include a tetradecyl group, a pentadecyl group, a hexadecyl group, a heptadecyl group, an octadecyl group, a nonadecyl group, and an icosyl group. The alkyl group having 14 to 20 carbon atoms may be a mixed alkyl group derived from natural fats and oils. Examples of the alkenyl group having 14 to 20 carbon atoms include a tetradecenyl group, a pentadecenyl group, a hexadecenyl group, a heptadecenyl group, an octadecenyl group, an oleyl group, a linoleyl group, a nonadecenyl group, and an icosenyl group.

Examples of the counter anion of the quaternary onium salt include chloride ($Cl^-$), bromide ($Br^-$), methyl sulfate ($CH_3OSO_3^-$), ethyl sulfate ($C_2H_5OSO_3^-$), and paratoluene sulfonate ($p\text{-}CH_3C_6H_4SO_3^-$).

Specific examples of the quaternary onium salt include dodecyl dimethyl benzyl ammonium chloride, dodecyl dimethyl benzyl ammonium bromide, tetradecyl dimethyl benzyl ammonium chloride, tetradecyldimethylbenzyl ammonium bromide, hexadecyl dimethyl benzyl ammonium chloride, hexadecyl dimethyl benzyl ammonium bromide, octadecyl dimethyl benzyl ammonium chloride, octadecyldimethylbenzyl ammonium bromide, trioctylbenzyl ammonium chloride, trioctylbenzyl ammonium bromide, trioctylbenzyl phosphonium chloride, trioctylbenzyl phosphonium bromide, tris(decyl)benzyl ammonium chloride, tris(decyl)benzyl ammonium bromide, tris(decyl)benzyl phosphonium chloride, tris(decyl)benzylphosphonium bromide, tetraoctyl ammonium chloride, tetraoctyl ammonium bromide, tetraoctyl phosphonium chloride, tetraoctyl phosphonium bromide, tetranonyl ammonium chloride, tetranonyl ammonium bromide, tetranonyl phosphonium chloride, tetranonyl phosphonium bromide, tetrakis(decyl) ammonium chloride, tetrakis(decyl)ammonium bromide, tetrakis(decyl)phosphonium chloride, and tetrakis(decyl) phosphonium bromide.

"Tris(decyl)" and "tetrakis (decyl)" mean having 3 or 4 decyl groups which are alkyl groups having 10 carbon atoms and are different from a tridecyl group which is an alkyl group having 13 carbon atoms or a tetradecyl group which is an alkyl group having 14 carbon atoms.

As the antistatic agent, nonionic, cationic, anionic, and amphoteric surfactants, ionic liquid, alkali metal salt, metal oxide, a metal fine particle, a conductive polymer, carbon, carbon nanotubes and the like can also be used.

Examples of the nonionic surfactant include polyoxyethylene alkyl ethers, polyoxyethylene alkyl phenyl ethers, sorbitan fatty acid esters, polyoxyethylene sorbitan fatty acid esters, polyoxyethylene fatty acid esters, glycerin fatty acid esters, propylene glycol fatty acid esters, and polyoxyalkylene-modified silicones.

Examples of the anionic surfactant include monoalkyl sulfate, alkyl polyoxyethylene sulfates, alkylbenzenesulfonic acid salts, and monoalkyl phosphates.

Examples of the amphoteric surfactant include alkyldimethylamine oxide and alkylcarboxybetaine.

The ionic liquid is a non-polymeric substance including anions and cations and being liquid at room temperature (for example, 25° C.). Examples of the cation portion include a cyclic amidine ion such as an imidazolium ion, a pyridinium ion, an ammonium ion, a sulfonium ion, and a phosphonium ion. Examples of the anion portion include $C_nH_{2n+1}COO^-$, $C_nF_{2n+1}COO^-$, $NO_3^-$, $C_nF_{2n+1}SO_3^-$, $(C_nF_{2n+1}SO_2)_2N^-$, $(C_nF_{2n+1}SO_2)_3C^-$, $PO_4^{2-}$, $AlCl_4^-$, $Al_2Cl_7^-$, $ClO_4^-$, $BF_4^-$, $PF_6^-$, $AsF_6^-$, and $SbF_6^-$.

Examples of the alkali metal salt include metal salt consisting of lithium, sodium, potassium. In order to stabilize ionic substances, a compound containing a polyoxyalkylene structure may be added.

The antistatic agent is contained preferably in an amount of 0.1 to 10 parts by mass with respect to 100 parts by mass of the copolymer composition.

In the case where the laminate obtained by forming the layer (b) on the temporary support is laminated to the layer (a), the difference between the surface tension of the surface of the layer (a) and the surface tension of the surface of the layer (b) side of the laminate obtained by providing the layer (b) on the temporary support is preferably −10 to 15 mN/m, more preferably −5 to 10 mN/m, and most preferably from −5 to 5 mN/m. In a case where the surface tension difference is within the above range, the attractive force acting between the particles can be reduced, and the aggregation of the particle can be suppressed.

(Temporary Support)

As the temporary support in a case where the laminate obtained by forming the layer (b) on the temporary support is laminated to the layer (a), a plastic film consisting of a resin having transparency and flexibility is preferably used. Preferable examples of the plastic film for the temporary support include a polyester film such as polyethylene terephthalate, polyethylene naphthalate, polyethylene isophthalate, and polybutylene terephthalate, a (meth)acrylic resin, a polycarbonate resin, a polystyrene type resin, a polyolefin resin, a cyclic polyolefin resin, and a cellulose resin such as cellulose acylate. (Here, the (meth)acrylic resin is preferably a polymer having a lactone ring structure, a polymer having a glutaric anhydride ring structure, and a polymer having a glutarimide ring structure.).

Other plastic films can be used as long as the plastic films have required strength and optical suitability. The temporary support may be an unstretched film or may be uniaxially or biaxially stretched. Otherwise, the temporary support may be a plastic film in which an angle of the axis direction formed according to the stretching ratio and stretching crystallization is controlled.

As the temporary support, those having ultraviolet permeability are preferable. It is preferable to have ultraviolet ray permeability in view of manufacturing suitability, since in the step (2), ultraviolet irradiation from the coating layer side can be performed in a case of curing the layer (a).

Specifically, the maximum transmittance of the temporary support at the wavelength of 250 nm to 300 nm is preferably 20% or greater, more preferably 40% or greater, and most preferably 60% or greater. It is preferable that the maximum transmittance at 250 nm to 300 nm is 20% or greater, since the layer (a) can be easily cured by being irradiated with ultraviolet rays from the coating layer side.

In the case where the laminate obtained by forming the layer (b) on the temporary support is laminated to the layer (a), the transmittance in the state where the layer (b) is formed on the temporary support is preferably within the above range.

As the laminate obtained by forming the layer (b) on the temporary support, a commercially available protective film can be suitably used. Specific examples thereof include AS3-304, AS3-305, AS3-306, AS3-307, AS3-310, AS3-0421, AS3-0520, AS3-0620, LBO-307, LBO-307, NBO-0424, ZBO-0421, S-362, TFB-4T3-367AS manufactured by Fujimori Kogyo Co., Ltd.

[Step (1-2)]

The step (1-2) may be provided between the steps (1) and (2).

The step (1-2) is a step of causing a portion of the curable compound (a1) to permeate the substrate (to the functional layer, in a case where the substrate has a functional layer).

In the step (1-2), the laminate having the substrate, the layer (a), and the layer (b) is preferable. By the heating, it is possible to cause a portion of the curable compound (a1) to effectively permeate the substrate. The temperature in heating is preferably smaller than the glass transition temperature of the substrate. Specifically, the temperature is preferably 60° C. to 180° C., more preferably 80° C. to 180° C., and still more preferably 80° C. to 130° C.

In a case where the heating is performed, it is preferable that the boiling point of at least one of the compounds (b1) of the layer (b) is the temperature during heating or greater. In a case where all of the boiling points of the compounds constituting the layer (b) are the heating temperature or lower, the compounds volatilize during heating, the particle protrudes during heating, and thus particle aggregation cannot be suppressed.

[Step (2)]

The step (2) is a step of curing the layer (a) while a state in which the particle (a2) is not exposed from the surface of the layer (b) is maintained.

The expression "curing the layer (a)" means polymerizing the curable compound (a1) included in the layer (a), and a binder resin in the completed antireflection layer can be formed. At this point, in a case where a state in which the particle (a2) is not exposed from the surface of the layer (b) is maintained, the aggregation of the particle (a2) is suppressed and the moth eye structure can be formed.

The curing can be performed by irradiation with ionizing radiation. The kind of ionizing radiation is not particularly limited, and examples thereof include X-rays, electron beams, ultraviolet rays, visible light, and infrared rays. However, ultraviolet light is widely used. For example, in a case where the coating film is ultraviolet curable, it is preferable that the curable compound (a1) of the layer (a) is cured by being irradiated with ultraviolet rays in an irradiation amount of 10 mJ/cm$^2$ to 1,000 mJ/cm$^2$ by an ultraviolet lamp. The irradiation amount is more preferably 50 mJ/cm$^2$ to 1,000 mJ/cm$^2$ and still more preferably 100 mJ/cm$^2$ to 500 mJ/cm$^2$. At the time of irradiation, the energy may be applied at once or may be applied in a divided manner. As the ultraviolet lamp type, a metal halide lamp, a high pressure mercury lamp, or the like is suitably used.

The oxygen concentration at the curing is preferably 0 to 1.0 vol %, more preferably 0 to 0.1 vol %, and most preferably 0 to 0.05 vol %. In a case where the oxygen concentration at curing is smaller than 1.0 volume %, curing inhibition caused by oxygen is hardly received, and the film becomes strong.

In the step (2), it is preferable that a plurality of the particles (a2) do not exist in a direction orthogonal to the surface of the substrate.

In step (2), the total film thickness of the film thickness of a portion of the layer (a) in which the particle (a2) does not exist, and the film thickness of the layer (b) is preferably greater than the average primary particle diameter of the particle (a2). Accordingly, it is easy to prevent the particle (a2) from being exposed on the surface of the layer (b). However, in order to obtain the moth eye structure by causing the particle (a2) to protrude from the surface of the layer (a) in a case where the layer (b) is removed in the step (3), it is preferable that the film thickness of the portion of the layer (a) in which the particle (a2) does not exist is smaller than the average primary particle diameter of the particle (a2) in the step (2).

The film thickness of the portion of the layer (a) in which the particle (a2) do not exist is preferably 10 nm to 100 nm, more preferably 20 nm to 90 nm, and most preferably 30 nm to 70 nm.

The film thickness of the portion of the layer (b) is preferably 50 nm to 10 μm, more preferably 100 nm to 5 μm, and most preferably 200 nm to 1 μm.

In the case where the laminate obtained by forming the layer (b) on the temporary support is provided in a manner of being laminated to the layer (a), the film thickness of the layer (b) is preferably 0.1 μm to 50 μm, more preferably 1 μm to 30 μm, and most preferably 1 μm to 10 μm.

[Step (3)]

Step (3) is a step of removing the layer (b).

The method for removing the layer (b) is not particularly limited, and a method of using a solvent that dissolves the compound (b1) without dissolving the substrate and the cured layer (a) (for example, washing with the above solvent), a method of heating the compound (b1) by performing heating at a temperature higher than the boiling point of the compound (b1), and a method of dissolving the compound (b1) with an alkaline solution, and the like are preferable.

The solvent that dissolves the compound (b1) without dissolving the substrate is not particularly limited. In a case where the substrate is triacetyl cellulose, an alcohol solvent such as methanol, ethanol, 2-propanol, 1-propanol, n-butanol, isobutanol, diacetone alcohol, and methoxypropanol, a ketone solvent such as methyl isobutyl ketone and methyl butyl ketone, an aromatic solvent such as toluene and xylene, cyclohexane, propylene glycol monomethyl ether acetate, and the like are preferable. A plurality of these solvents may be mixed to be used.

The heating temperature in a case where the compound (b1) is volatilized is preferably a temperature lower than the glass transition temperature of the substrate and higher than the boiling point of the compound (b1), and is specifically 60° C. to 180° C. and more preferably 80° C. to 130° C.

As a solution in a case of being dissolved in an alkaline solution, an aqueous solution of sodium hydroxide or potassium hydroxide is preferably used.

In the case where the laminate obtained by forming the layer (b) on the temporary support is provided in a manner of being laminated to the layer (a), the layer (b) is preferably peeled off together with the temporary support. It is preferable that the layer (b) is the pressure sensitive adhesive layer that has a slight adhesive force in which peeling strength (adhesive strength) to the surface of the adherend is about 0.03 to 0.3 N/25 mm, since workability in a case where the laminate is peeled off from the adherend is excellent.

The components forming the layer (b) may be transferred and remain on the layer (a) side after the laminate is peeled off. In that case, it is also preferable that the layer (b) is removed by using a solvent which dissolves only the components forming the layer (b) without dissolving the substrate and the cured layer (a).

After the layer (b) is removed in the step (3), it is possible to obtain an antireflection film having a moth eye structure consisting of an uneven shape by the particle (a2) on the surface of the layer (a).

After the step (3), it is preferable that a plurality of the particles (a2) do not exist in a direction orthogonal to the surface of the substrate.

[Antireflection Film]

Figure 2:
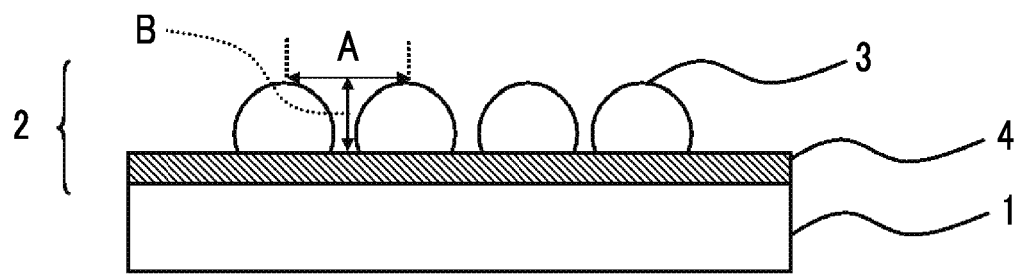
FIG. 2 is a cross-sectional schematic view illustrating an example of an antireflection film manufactured by the manufacturing method of the present invention.

An example of a preferable embodiment of an antireflection film of the present invention is illustrated in FIG. 2.

An antireflection film 10 in FIG. 2 has a substrate 1 and an antireflection layer 2. The antireflection layer 2 includes a particle (a2) (reference numeral 3) and a binder resin 4 which is a cured layer (a). The particle 3 protrudes from the binder resin 4 to form a moth eye structure.

(Moth Eye Structure)

The moth eye structure refers to a surface obtained by processing of a substance (material) for suppressing reflection of light and a structure of having a periodic microstructure pattern. Particularly, in a case of having the purpose of suppressing reflection of visible light, the moth eye structure refers to a structure having a microstructure pattern with a period of less than 780 nm. It is preferable that the period of the microstructure pattern is less than 380 nm, the color of reflected light becomes small. It is preferable that the periodicity of the uneven shape of the moth eye structure is 100 nm or greater, light having a wavelength of 380 nm can recognize a microstructure pattern and is excellent in antireflection properties. Whether the moth eye structure exists can be checked by observing the surface shape with a scanning electron microscope (SEM), an atomic force microscope (AFM) or the like, and checking whether the microstructure pattern is formed.

In the uneven shape of the antireflection layer of the antireflection film manufactured by the manufacturing method of the present invention, it is preferable that B/A which is the ratio of a distance A between the peaks of the adjacent protrusions and a distance B between the center between the peaks of the adjacent protrusions and the recessed part is 0.4 or greater. In a case where B/A is 0.4 or greater, the refractive index gradient layer in which the depth of the recessed part is greater than the distance between the protrusions and the refractive index gradually changes from the air to the inside of the antireflection layer can be formed, and thus the reflectance can be further reduced.

B/A can be controlled by the volume ratio of the binder resin and a particle in the antireflection layer after curing. Therefore, it is important to appropriately design the formulation ratio of the binder resin and the particle. In a case where the binder resin permeates the substrate in the step of preparing the moth eye structure or volatilizes, the volume ratio of the binder resin and the particle in the antireflection layer becomes different from the formulation ratio in the composition for forming the antireflection layer, and thus the matching with the substrate is appropriately set.

In order to realize the low reflectance and suppress the occurrence of haze, it is preferable that the particle for forming the protrusions is spread uniformly at an appropriate filling rate. In view of the above, the content of the inorganic particle for forming the protrusions is preferably adjusted such that the inorganic particle is uniform over the entire antireflection layer. The filling rate can be measured as the area occupation ratio (particle occupancy ratio) of the inorganic particle located on the most surface side in a case of observing the inorganic particle for forming the protrusions from the surface by SEM or the like, and is preferably 25% to 64%, more preferably 25% to 50%, and still more preferably 30% to 45%.

[Hard Coat Layer]

In the present invention, a hard coat layer can further be provided between the substrate and the layer (a). In the case of having a hard coat layer on a substrate, as described above, in the present invention, the hard coat layer on the substrate is also referred to as a substrate.

The hard coat layer is preferably formed by a crosslinking reaction or a polymerization reaction of a curable compound (preferably an ionizing radiation curable compound) which is a compound having a polymerizable group. For example, the hard coat layer can be formed by coating the substrate with a coating composition including an ionizing radiation curable polyfunctional monomer or polyfunctional oligomer and crosslinking reaction or polymerization reaction of the polyfunctional monomer or polyfunctional oligomer.

As the functional group (polymerizable group) of the ionizing radiation curable polyfunctional monomer or polyfunctional oligomer, those having light, electron beams, or radiation polymerizability are preferable. Among them, a photopolymerizable functional group is preferable.

Examples of the photopolymerizable functional group include unsaturated polymerizable functional groups such as a (meth)acryloyl group, a vinyl group, a styryl group, and an allyl group. Among them, a (meth)acryloyl group is preferable.

Specifically, the same compound as the curable compound (a) described above can be used.

In view of applying sufficient durability and impact resistance to the film, the thickness of the hard coat layer is usually about 0.6 μm to 50 μm and preferably 5 μm to 20 μm.

The strength of the hard coat layer is preferably H or greater and more preferably 2H or greater in the pencil hardness test. In the Taber test according to JIS K5400, it is preferable that the abrasion amount of the test piece before and after the test is small.

The hard coat layer in the present invention preferably contains cellulose acylate in an area within 1 μm from the interface with the antireflection layer in the film thickness direction.

As cellulose acylate, substrates disclosed in [0072] to [0084] JP2012-093723A and the like can be preferably used.

The hard coat layer including cellulose acylate in an area within 1 μm from the interface with the antireflection layer in the film thickness direction can be formed, for example, by coating a substrate (a cellulose acylate film or the like) including cellulose acylate with a composition for forming a hard coat layer having permeability to the substrate and containing a solvent and a curable compound, causing the curable compound to be permeated to the substrate, and curing the composition. The hard coat layer can also be formed by mixing and curing cellulose acylate and the curable compound.

In a case where the antireflection film is cut with a microtome and the cross section was analyzed with a time-of-flight secondary ion mass spectrometer (TOF-SIMS), the hard coat layer can be measured as a portion, a cured product of cellulose acylate and the ionizing radiation curable compound is detected, and the film thickness of this area can also be measured from the cross-sectional information of the TOF-SIMS in the same manner.

The hard coat layer can be measured by detecting another layer between the substrate and the antireflection layer by observing the cross section, for example, by a reflection spectroscopic film thickness meter utilizing interference of light or a transmission electron microscope (TEM). As the reflective spectroscopic film thickness meter, FE-3000 (manufactured by Otsuka Electronics Co., Ltd.) or the like can be used.

In the present invention, in a case where the layer (a) to be the antireflection layer is laminated on the hard coat layer, in the step (1-2), a method of preliminarily half-curing the hard coat layer such that the curable compound (a) which is the compound for forming the binder of the antireflection layer can permeate the hard coat layer, and then fully curing the hard coat layer after the curable compound (a) which is the compound for forming the binder of the antireflection layer permeates and the like is preferable.

For example, in a case where the coating film is ultraviolet-curable, the hard coat layer can be half-cured by appropriately adjusting the oxygen concentration in a case of curing and the ultraviolet irradiation amount. It is preferable that the coating film is cured by being irradiated with ultraviolet rays in an irradiation amount of 1 mJ/cm$^2$ to 300 mJ/cm$^2$ by an ultraviolet lamp. The irradiation amount is more preferably 5 mJ/cm$^2$ to 100 mJ/cm$^2$ and still more preferably 10 mJ/cm$^2$ to 70 mJ/cm$^2$. At the time of irradiation, the energy may be applied at once or may be applied in a divided manner. As the ultraviolet lamp type, a metal halide lamp, a high pressure mercury lamp, or the like is suitably used.

The oxygen concentration at the curing is preferably 0.05 to 5.0 vol %, more preferably 0.1 to 2 vol %, and most preferably 0.1 to 1 vol %.

(Solvent Having Permeability to Cellulose Acylate)

The composition for forming the hard coat layer preferably contains a solvent (also referred to as "permeable solvent") having permeability to cellulose acylate.

A solvent having permeability to cellulose acylate is a solvent having solubility to a substrate (cellulose acylate substrate) containing cellulose acylate.

Here, the solvent having dissolving ability with respect to the cellulose acylate substrate refers to a solvent having a peak surface area of cellulose acylate of 400 mV/sec or greater in a case where a cellulose acylate substrate having a size of 24 mm×36 mm (thickness 80 μm) is immersed for 60 seconds at room temperature (25° C.) in a 15 ml bottle containing the above solvent and extracted, and then the immersed solvent is analyzed by gel permeation chromatography (GPC). Alternatively, a solvent in which a cellulose acylate substrate having a size of 24 mm×36 mm (thickness 80 μm) is left for 24 hours at room temperature (25° C.) in a 15 ml bottle containing the above solvent, the bottle is appropriately shaken or the like, and the cellulose acylate substrate is completely disappeared also means a solvent having dissolving ability with respect to the cellulose acylate substrate.

As the permeable solvent, methyl ethyl ketone (MEK), dimethyl carbonate, methyl acetate, acetone, methylene chloride, and the like can be preferably used, but the present invention is not limited thereto. Methyl ethyl ketone (MEK), dimethyl carbonate, and methyl acetate are more preferable.

The composition for forming the hard coat layer may contain a solvent (for example, isopropanol (IPA), methyl isobutyl ketone (MIBK), and toluene) in addition to the permeable solvent.

In the composition for forming a hard coat layer, the content of the permeable solvent is preferably 50 mass % to 100 mass % and more preferably 70 mass % to 100 mass % with respect to the total mass of the solvent included in the composition for forming a hard coat layer.

The solid content concentration of the composition for forming a hard coat layer is preferably 20 mass % to 60 mass % and more preferably 30 mass % to 50 mass %.

(Other Components)

In addition to the above components, a polymerization initiator, an antistatic agent, an anti-glare agent, and the like can be suitably added to the composition for forming a hard coat layer. Various additives such as reactive or non-reactive leveling agents and various sensitizers may be mixed.

(Polymerization Initiator)

If necessary, radicals and cationic polymerization initiators and the like may be suitably selected to be used. These polymerization initiators are decomposed by light irradiation and/or heating to generate radicals or cations and promote radical polymerization and cationic polymerization.

(Antistatic Agent)

As specific examples of the antistatic agent, well-known antistatic agents in the related art such as quaternary ammonium salt, a conductive polymer, and a conductive fine particle and the like can be used.

(Refractive Index Adjusting Agent)

For the purpose of controlling the refractive index of the hard coat layer, a high refractive index monomer or an inorganic particle can be added as a refractive index adjusting agent. In addition to the effect of controlling the refractive index, the inorganic particle has an effect of suppressing curing shrinkage due to the crosslinking reaction. According to the present invention, after the hard coat layer is formed, the polymer formed by polymerizing the polyfunctional monomer and/or the high refractive index monomer or the like and the inorganic particle dispersed the polymer are collectively referred to as a binder.

(Leveling Agent)

As specific examples of the leveling agent, a well-known leveling agent in the related art such as a fluorine-based or silicone-based leveling agent can be used. The composition for forming a hard coat layer to which the leveling agent is added can provide coating stability to the surface of the coating film in a case of coating or drying.

The antireflection film manufactured by the manufacturing method of the present invention can be suitably used as a polarizing plate protective film.

The polarizing plate protective film using the antireflection film manufactured by the manufacturing method of the present invention can be laminated to a polarizer to form a polarizing plate and can be suitably used for a liquid crystal display device and the like.

[Polarizing Plate]

The polarizing plate is a polarizing plate having a polarizer and at least one of the protective films for protecting the polarizer, and it is preferable that at least one of the protective films is an antireflection film manufactured by the method for manufacturing the antireflection film of the present invention.

The polarizer includes an iodine-containing polarizing film, a dye-based polarizing film using a dichroic dye, and a polyene-based polarizing film. The iodine-containing polarizing film and the dye-based polarizing film can be generally manufactured by using a polyvinyl alcohol-based film.

[Cover Glass]

The antireflection film manufactured by the method for manufacturing an antireflection film of the present invention can also be applied to a cover glass.

[Image Display Device]

The antireflection film manufactured by the method for manufacturing an antireflection film of the present invention can also be applied to an image display device.

Examples of the image display device include a liquid crystal display device (LCD), a plasma display panel (PDP), an electroluminescent display (ELD), and a cathode ray tube display device (CRT), and a liquid crystal display device is particularly preferable.

Generally, a liquid crystal display device has a liquid crystal cell and two polarizing plates disposed on both sides of the liquid crystal cell, and the liquid crystal cell carries a liquid crystal between the two electrode substrates. One optically anisotropic layer may be arranged between the liquid crystal cell and one polarizing plate, or two optically anisotropic layers may be arranged between the liquid crystal cell and both polarizing plates. The liquid crystal cell is preferably a TN mode, a VA, mode, an OCB mode, an IPS mode, or an ECB mode.

EXAMPLES

Hereinafter, the present invention is specifically described with reference to examples. Materials, reagents, substance amounts, and proportions thereof, operations, and the like shown in the following examples can be appropriately changed without departing from the gist of the present invention. Therefore, the scope of the present invention is not limited to the following specific examples.

Example 1

(Preparation of Composition for Forming Hard Coat Layer)

Each component was added in the following composition, and the obtained composition was introduced to a mixing tank, stirred, and filtrated with a polypropylene filter having a pore size of 0.4 µm so as to obtain a hard coat layer coating liquid HC-1.

(Hard Coat Layer Coating Liquid HC-1)

| A-TMMT | 33.6 parts by mass |
| IRGACURE 127 | 1.4 parts by mass |
| Methyl ethyl ketone (MEK) | 35.8 parts by mass |
| Methyl acetate | 29.2 parts by mass |

A-TMMT: Pentaerythritol tetraacrylate (manufactured by Shin-Nakamura Chemical Co., Ltd.)
IRGACURE 127: Photopolymerization initiator (manufactured by BASF Japan Ltd.)

[Synthesis of Silica Particle P1]

67.54 kg of methyl alcohol and 26.33 kg of 28 mass % ammonia water (water and catalyst) were introduced to a reactor having a volume of 200 L equipped with a stirrer, a dropping device, and a thermometer, and the liquid temperature was adjusted to 33° C. while stirring. On the other hand, a solution prepared by dissolving 12.70 kg of tetramethoxysilane in 5.59 kg of methyl alcohol was introduced to the dropping device. While the liquid temperature in the reactor was maintained to 33° C., the above solution was added dropwise from the dropping device over 44 minutes. After the dropwise addition was completed, stirring was continued while the liquid temperature was maintained to the above temperature for 44 minutes, and hydrolysis and condensation of tetramethoxysilane were performed, so as to obtain a dispersion liquid containing a silica particle precursor. This dispersion liquid was air-dried in the conditions of a heating tube temperature of 175° C. and a reduced pressure degree of 200 torr (27 kPa) using an instantaneous vacuum evaporator (CRUX SYSTEM CVX-8B model manufactured by Hosokawa Micron Corp.), so as to obtain a silica particle P1.

The average particle diameter of the silica particle P1 was 180 nm, the dispersion degree (CV value) of the particle diameter was 3.3%, and the indentation hardness was 340 MPa.

[Preparation of Calcined Silica Particle P2]

5 kg of a silica particle P1 were introduced to a crucible, calcined at 900° C. for two hours in an electric furnace, cooled, and then pulverized by using a pulverizer, to obtain a calcined silica particle before classification. Disintegration and classification were performed by using a jet pulverizing classifier (IDS-2 model manufactured by Nippon Pneumatic Mfg., Co., Ltd.) to obtain a calcined silica particle P2.

The average primary particle diameter of the silica particle P2 was 180 nm, the dispersion degree (CV value) of the particle diameter was 3.3%, and the indentation hardness was 470 MPa.

[Preparation of Silane Coupling Agent-Treated Silica Particle P3]

5 kg of the calcined silica particle P2 before classification was introduced to a Henschel mixer (FM20J model manufactured by Nippon Coke & Engineering Co., Ltd.) having a capacity of 20 L equipped with a heating jacket. A solution obtained by dissolving 45 g of 3-acryloxypropyltrimethoxysilane (KBM 5103 manufactured by Shin-Etsu Chemical Co., Ltd.) in 90 g of methyl alcohol was added dropwise to a portion in which the calcined silica particle P2 were stirred and mixed. Thereafter, the temperature was raised to 150° C. over about one hour while mixing and stirring, and the mixture was maintained at 150° C. for 12 hours, and heat treatment was performed. During the heat treatment, the scraping device was constantly rotated in the direction opposite to the stirring blade, deposits on the wall were scraped off. If necessary, the deposits on the wall were scraped off with a spatula. After heating, cooling was performed, and disintegration and classification were performed by using a jet pulverization classifier, so as to obtain a silane coupling agent treated silica particle P3.

The average primary particle diameter of the silica particle P3 was 181 nm, the dispersion degree (CV value) of the particle diameter was 3.3%, and the indentation hardness was 470 MPa.

[Preparation of Silica Particle Dispersion Liquid PA-1]

50 g of the silica particle P2, 200 g of MEK, and 600 g of zirconia beads having a diameter of 0.05 mm were introduced to a 1 L bottle having a diameter of 12 cm, were set in a ball mill V-2M (Irie Shokai Co., Ltd.), and were dispersed at 250 rotations/minute for 10 hours.

[Preparation of Silica Particle Dispersion Liquid PA-2]

50 g of the silica particle P3, 200 g of MEK, and 600 g of zirconia beads having a diameter of 0.05 mm were introduced to a 1 L bottle having a diameter of 12 cm, were set in a ball mill V-2M (Irie Shokai Co., Ltd.), and were dispersed at 250 rotations/minute for 10 hours.

[Synthesis of Compound C3]

19.3 g of 3-isocyanatepropyltrimethoxysilane, 3.9 g of glycerin 1,3-bisacrylate, 6.8 g of 2-hydroxyethyl acrylate, 0.1 g of dibutyltin dilaurate, 70.0 g of toluene were added to a flask equipped with a reflux condenser and a thermometer and were stirred at room temperature for 12 hours. After stirring, 500 ppm of methylhydroquinone was added, and distillation under reduced pressure was performed, so as to obtain compound C3.

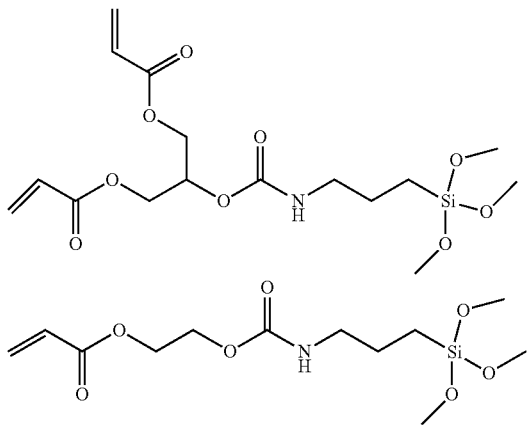

C3

(Preparation of Coating Liquid for Forming Layer (a))

Each component was introduced to a mixing tank so as to have the following composition, was stirred for 60 minutes, was dispersed by an ultrasonic disperser for 30 minutes, and was filtrated with a polypropylene filter having a pore diameter of 5 μm to obtain a coating liquid for forming the layer (a).

Coating Liquid A-1 for Forming Layer (a)

| | |
|---|---|
| U15HA | 1.0 part by mass |
| Compound C3 | 8.7 parts by mass |
| IRGACURE127 | 0.4 parts by mass |
| Silica particle dispersion liquid PA-1 | 25.4 parts by mass |
| Compound A | 0.05 parts by mass |
| Ethanol | 15.0 parts by mass |
| Methyl ethyl ketone | 34.5 parts by mass |
| Acetone | 15.0 parts by mass |

Coating Liquid A-2 for Forming Layer (a)

| | |
|---|---|
| U15HA | 1.0 part by mass |
| Compound C3 | 8.7 parts by mass |
| IRGACURE127 | 0.4 parts by mass |
| Silica particle dispersion liquid PA-2 | 25.4 parts by mass |
| Compound A | 0.05 parts by mass |
| Ethanol | 15.0 parts by mass |
| Methyl ethyl ketone | 34.5 parts by mass |
| Acetone | 15.0 parts by mass |

Coating Liquid A-3 for Forming Layer (a)

| | |
|---|---|
| U15HA | 1.0 part by mass |
| Compound C3 | 8.7 parts by mass |
| IRGACURE127 | 0.4 parts by mass |
| Silica particle dispersion liquid PA-2 | 25.4 parts by mass |
| Ethanol | 15.0 parts by mass |
| Methyl ethyl ketone | 34.5 parts by mass |
| Acetone | 15.0 parts by mass |

In the coating liquids A-1 to A-3 for forming layer (a), U15HA and compound C3 were the curable compound (a1).

(Preparation of Coating Liquid for Forming Layer (b))

Each component was introduced to a mixing tank so as to have the following composition, was stirred for 60 minutes, and was filtrated with a polypropylene filter having a pore diameter of 5 μm to obtain a coating liquid for forming the layer (b).

Coating Liquid B-1 for Forming Layer (b)

| | |
|---|---|
| KF96-10cs | 10.0 parts by mass |
| KF96L-0.65cs | 90.0 parts by mass |

Coating Liquid B-2 for Forming Layer (b)

| | |
|---|---|
| KF96-10cs | 1.0 parts by mass |
| KF96L-0.65cs | 99.0 parts by mass |

Coating Liquid B-3 for Forming Layer (b)

| | |
|---|---|
| KF96-10cs | 50.0 parts by mass |
| KF96L-0.65cs | 50.0 parts by mass |

Coating Liquid B-4 for Forming Layer (b)

| | |
|---|---|
| KF96-10cs | 100.0 parts by mass |

Coating Liquid B-5 for Forming Layer (b)

| | |
|---|---|
| KF96-100cs | 10.0 parts by mass |
| KF96L-0.65cs | 90.0 parts by mass |

Coating Liquid B-6 for Forming Layer (b)

| | |
|---|---|
| KF96-10000cs | 10.0 parts by mass |
| KF96L-0.65cs | 90.0 parts by mass |

Coating Liquid B-7 for Forming Layer (b)

| | |
|---|---|
| KF96-100000cs | 10.0 parts by mass |
| KF96L-0.65cs | 90.0 parts by mass |

Coating Liquid B-8 for Forming Layer (b)

| | |
|---|---|
| Liquid paraffin | 10.0 parts by mass |
| KF96L-0.65cs | 90.0 parts by mass |

Coating Liquid B-9 for Forming Layer (b)

| | |
|---|---|
| KF96-10cs | 5.0 parts by mass |
| KF96L-0.65cs | 95.0 parts by mass |

Coating Liquid B-10 for Forming Layer (b)

| | |
|---|---|
| KF96L-0.65cs | 100.0 parts by mass |

The compounds used are provided below.

U15HA (manufactured by Shin-Nakamura Chemical Co., Ltd.): Urethane acrylate IRGACURE 127: Photopolymerization initiator (manufactured by BASF Japan Ltd.) Compound A Fluorine-based leveling agent represented by the following formula

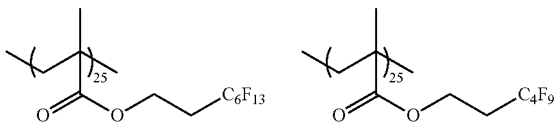
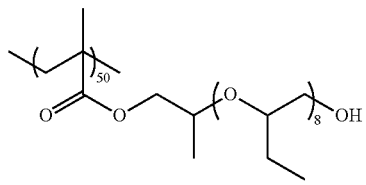

Mw: 25000

KF96-10 cs (manufactured by Shin-Etsu Chemical Co., Ltd.): Silicone oil, kinematic viscosity (25° C.) 10 mm$^2$/s, boiling point 200° C. or higher KF96L-0.65 cs (manufactured by Shin-Etsu Chemical Co., Ltd.): Silicone oil, kinematic viscosity (25° C.) 0.65 mm$^2$/s, boiling point 100° C.

KF96-100 cs (manufactured by Shin-Etsu Chemical Co., Ltd.): Silicone oil, kinematic viscosity (25° C.) 100 mm$^2$/s, boiling point 200° C. or higher KF96-10000 cs (manufactured by Shin-Etsu Chemical Co., Ltd.): Silicone oil, kinematic viscosity (25° C.) 10,000 mm$^2$/s, boiling point 200° C. or higher KF96-100000 cs (manufactured by Shin-Etsu Chemical Co., Ltd.): Silicone oil, kinematic viscosity (25° C.) 100,000 mm$^2$/s, boiling point 200° C. or higher Liquid paraffin (manufactured by Wako Pure Chemical Industries, Ltd.): Hydrocarbon-based oil, reagent special grade, kinematic viscosity (25° C.) 150 mm$^2$/s, boiling point 200° C. or higher In all of the above oils, the maximum transmittance at a wavelength of 250 nm to 300 nm per 10 μm of the film thickness was 100%.

The transmittance was measured using an ultraviolet-visible-near infrared spectrophotometer UV3150 manufactured by Shimadzu Corporation.

In a case where a measurement target is liquid, the liquid can be measured by being appropriately diluted with a solvent having small absorption and not having an influence on the measurement such that the transmittance at a wavelength of 250 am to 300 nm is not less than 10%. In this example, measurement was performed by diluting the liquid to 5% with dichloromethane. From the obtained transmittance spectrum, the transmittance per 10 μm of the film thickness was calculated in consideration of the dilution ratio and the specific gravity.

In the case where the measurement target is a film used in Example 2 described below, measurement is performed without change.

(Forming of Hard Coat Layer)

A cellulose triacetate film (TDH60UF, manufactured by Fujifilm Corporation) was coated with the coating liquid HC-1 for hard coat layer by using a die coater. After drying was performed at 30° C. for 90 seconds and at 60° C. for one minute, nitrogen purging was performed such that the atmosphere had an oxygen concentration of about 0.3%, the coating layer was cured by being irradiated with ultraviolet rays having an illuminance of 200 mW/cm$^2$ and an irradiation amount of 60 mJ/cm$^2$ by using an air-cooled metal halide lamp (manufactured by Eye Graphics Co., Ltd.) having a power of 160 W/cm, to form a hard coat layer having a thickness of 5 μm. The substrate with the hard coat layer was HC-1.

<Preparation of Antireflection Film 1>

(Step (1) Coating of Layers (a) and (b))

The hard coat layer of the substrate HC-1 with a hard coat layer was coated with 2.8 ml/m$^2$ of a coating liquid for forming the layer (a) and was dried at 30° C. for 90 seconds. Subsequently, the layer (a) was coated with 10 ml/ml$^2$ of the coating liquid for forming the layer (b) by using a die coater. The film thicknesses of the layers (a) and (b) were as presented in Table 1 below.

(Step (1-2) Permeation of Curable Compound (a1) to Hard Coat Layer)

After drying was performed at 30° C. for 90 seconds, heating was performed at 100° C. for five minutes, such that a part of the curable compound (a1) permeates the hard coat layer.

(Step (2) Curing of Layer (a))

Subsequently to the heating, the layer (a) was cured by being irradiated with ultraviolet rays having an illuminance of 200 mW/cm$^2$ and an irradiation amount of 300 mJ/cm$^2$ by using an air cooling metal halide lamp (manufactured by Eye Graphics Co., Ltd.) of 160 W/cm while purging was performed with nitrogen such that the atmosphere had an oxygen concentration of 0.01 vol % or less. After the step (2), the film thicknesses of the layers (a) and (b) before the step (3) is performed are as provided in Table 1 below.

(Step (3) Removal of Layer (b))

Methyl isobutyl ketone was applied to the surface coated with the layer (b) of the cured film, and the layer was immersed in a vat including methyl isobutyl ketone to remove the layer (b). Thereafter, the film was dried at room temperature for 10 minutes to obtain an antireflection film 1.

The antireflection films 2 to 14 were prepared in the same manner as the preparation of the antireflection film 1 except for changing whether the layer (b) is formed, the film thickness of the layers (a) and (b), the kind of the coating liquid for forming the layer (a), and the kind of the coating liquid for forming the layer (b) as in Table 1. With respect to the layer (a), the film thickness of the portion in which the particle (a2) does not exist was set as the film thickness of the layer (a).

(Method of Evaluating Antireflection Film]

Various properties of the antireflection film were evaluated by the following method. Results thereof are as presented in Table 2.

(Measurement of Surface Tension Difference Between Surface of Layer (a) and Compound (b1))

The surface tensions of the surface of the layer (a) and the compound (b1) were respectively measured in the above-described method, and the difference thereof was calculated, so as to obtain Δ surface tension.

With respect to the obtained antireflection film, 10 μm×10 μm in the plane was observed in three visual fields with a scanning electron microscope (SEM), it was checked that a moth eye structure was formed with all the films, and the proportion of the number of particles (a2) in a state in which a plurality of kinds thereof do not exist in a direction orthogonal to the surface in an overlapped manner was 90% or greater.

(Integrated Reflectance)

After the back side (cellulose triacetate film side) of the antireflection film was roughened with sandpaper, an oil black ink (magic ink for filling: Teranishi Chemical Industry Co., Ltd.) was applied, and Adapter ARV-474 was mounted on the spectral photometer V-550 (manufactured by JASCO Corporation) in a state in which the reflectance on the back side was removed, the integrated reflectance at an incidence angle of 5° was measured in the wavelength range of 380 to 780 nm, and the average reflectivity was calculated to evaluate the antireflection properties.

(Haze)

The uniformity of the surface was evaluated by a haze value. The total haze value (%) of the obtained antireflection film was measured in accordance with JIS-K7136 (2000). As a device, a haze meter NDH4000 manufactured by Nippon Denshoku Industries Co., Ltd. was used. In a case where a particle aggregated and was not homogeneous, the haze was high. As the haze was lower, the film was good and clear.

(Evaluation of Muddiness)

A black polyethylene terephthalate sheet with adhesive (manufactured by Tomoegawa Paper Co., Ltd.; "Kukkiri-mieru") was laminated on the surface opposite to the side provided with the coating layer of the substrate, so as to manufacture a 30 cm×30 cm of sample in which light reflection on the back side was prevented. This sample was diagonally irradiated on the surface of the sample with a desk lamp equipped with a three-wavelength fluorescent lamp (FL20SS/EX-N/18 (manufactured by Matsushita Electric Industrial Co., Ltd.)), and the muddiness observed at this point was visually evaluated.

A: Muddiness was not seen even though the sample was looked carefully.

B: Muddiness was seen in a case where the sample was looked carefully.

C: Muddiness was slightly seen on the entire film.

D: Muddiness was strongly seen on the entire film at a glance.

(Steel Wool (SW) Scratch Resistance)

A rubbing test was performed under the following conditions by using a rubbing tester so as to obtain an index of scratch resistance.

Evaluation environment condition: 25° C., 60% RH (relative humidity)

Rubbing material: Steel wool (manufactured by Nippon Steel Wool Co., Ltd., Gerade No. 0000)

A band was wrapped around a rubbing tip portion (1 cm×1 cm) of the tester in contact with the sample and was fixed.

Travel distance (one way): 13 cm,

Rubbing speed: 13 cm/sec,

Load: 100 g/cm$^2$,

Tip portion contact area: 1 cm×1 cm,

Number of rubbing: 10 round trips.

Oil black ink (magic ink for filling: Teranishi Chemical industry Co., Ltd.) was applied to the back side of the rubbed sample, scratches of the rubbing portion were visually observed with reflected light and visually observed so as to perform evaluation in the following criteria. Evaluation was performed by repeating the above test three times, and the resultant was averaged for evaluation.

A: There were several scratches, but the scratches were not seen in a case where the scratches were not observed carefully.

B: Several to dozens of scratches were seen.

Results thereof are as presented in Table 2. Accordingly, it is understood that the antireflection film manufactured by the manufacturing method of the present invention has low integrated reflectance, low haze, and excellent muddiness.

TABLE 1

| Antireflection film No. | Step (1) Layer (a) | | | | Step (1) | | Layer (b) | | | | | ΔSurface tension layer (a) − compound (b1) (mN/m) | Step (2) | | Step (3) Removal of layer (b) | Remark |
|---|---|---|---|---|---|---|---|---|---|---|---|---|---|---|---|---|
| | Coating liquid | Kind of particle | Diameter of particle | Film thickness | Surface tension (mN/m) | Coating liquid | Thickness of coating film | Compound (b1) having boiling point of 110° C. or greater | | | | | Film thickness of layer (a) | Film thickness of layer (b) | | |
| | | | | | | | | Kind | Kinematic viscosity (mm²/s) | Surface tension (mN/m) | | | | | | |
| 1 | A-1 | P2 | 180 nm | 200 nm | 26.9 | B-1 | 10 μm | KF96-10CS | 10 | 19.5 | | 7.4 | 50 nm | 1 μm | MIBK wash | Example |
| 2 | A-1 | P2 | 180 nm | 200 nm | 26.9 | — | — | — | — | — | | — | 60 nm | — | None | Comparative Example |
| 3 | A-2 | P3 | 180 nm | 200 nm | 26.9 | B-1 | 10 μm | KF96-10CS | 10 | 19.5 | | 7.4 | 50 nm | 1 μm | MIBK wash | Example |
| 4 | A-2 | P3 | 181 nm | 200 nm | 26.9 | — | — | — | — | — | | — | 60 nm | — | None | Comparative Example |
| 5 | A-2 | P3 | 181 nm | 200 nm | 26.9 | B-2 | 5 μm | KF96-10CS | 10 | 19.5 | | 7.4 | 50 nm | 100 nm | MIBK wash | Comparative Example |
| 6 | A-2 | P3 | 181 nm | 200 nm | 26.9 | B-3 | 10 μm | KF96-10CS | 10 | 19.5 | | 7.4 | 50 nm | 5 μm | MIBK wash | Example |
| 7 | A-2 | P3 | 181 nm | 200 nm | 26.9 | B-4 | 10 μm | KF96-10CS | 10 | 19.5 | | 7.4 | 50 nm | 10 μm | MIBK wash | Example |
| 8 | A-2 | P3 | 181 nm | 200 nm | 26.9 | B-5 | 10 μm | KF96-10CS | 100 | 19.5 | | 7.4 | 50 nm | 1 μm | MIBK wash | Example |
| 9 | A-2 | P3 | 181 nm | 200 nm | 26.9 | B-6 | 10 μm | KF96-10000CS | 10,000 | 19.5 | | 7.4 | 50 nm | 1 μm | MIBK wash | Example |
| 10 | A-2 | P3 | 181 nm | 200 nm | 26.9 | B-7 | 10 μm | KF96-100000CS | 100,000 | 19.5 | | 7.4 | 50 nm | 1 μm | MIBK wash | Example |
| 11 | A-3 | P3 | 181 nm | 200 nm | 38.1 | B-1 | 10 μm | KF96-10CS | 10 | 19.5 | | 18.6 | 50 nm | 1 μm | MIBK wash | Example |
| 12 | A-3 | P3 | 181 nm | 200 nm | 38.1 | B-8 | 10 μm | Liquid paraffin | 150 | 30.9 | | 7.2 | 50 nm | 1 μm | MIBK wash | Example |
| 13 | A-2 | P3 | 181 nm | 200 nm | 26.9 | B-9 | 10 μm | KF96-10CS | 10 | 19.5 | | 7.4 | 50 nm | 500 nm | MIBK wash | Example |
| 14 | A-2 | P3 | 181 nm | 200 nm | 26.9 | B-10 | 10 μm | — | — | — | | — | 60 nm | 0 nm | None | Comparative Example |

TABLE 2

| Antireflection film No. | Integrated reflectance | Haze (%) | Muddiness | SW scratch resistance | Remark |
|---|---|---|---|---|---|
| 1 | 0.9% | 1.6 | A | B | Example |
| 2 | 2.0% | 3.2 | D | B | Comparative Example |
| 3 | 1.0% | 1.9 | A | A | Example |
| 4 | 2.2% | 4.1 | D | A | Comparative Example |
| 5 | 2.0% | 3.6 | D | A | Comparative Example |
| 6 | 1.3% | 2 | C | A | Example |
| 7 | 1.7% | 2.9 | C | A | Example |
| 8 | 1.1% | 2 | B | A | Example |
| 9 | 1.3% | 2.3 | C | A | Example |
| 10 | 1.6% | 2.8 | C | A | Example |
| 11 | 1.4% | 2.1 | B | A | Example |
| 12 | 1.0% | 1.9 | A | A | Example |
| 13 | 1.0% | 1.9 | A | A | Example |
| 14 | 2.2% | 4.1 | D | A | Comparative Example |

Example 2

<Preparation of Antireflection Film 15>
(Forming of Hard Coat Layer)

A substrate (ZRT60, manufactured by Fujifilm Corporation) was coated with the coating liquid HC-1 for hard coat layer of Example 1 by using a die coater. After drying was performed at 30° C. for 90 seconds and at 60° C. for one minute, nitrogen purging was performed such that the atmosphere had an oxygen concentration of about 0.3%, the coating layer was cured by being irradiated with ultraviolet rays having an illuminance of 200 mW/cm² and an irradiation amount of 60 mJ/cm² by using an air-cooled metal halide lamp (manufactured by Eye Graphics Co., Ltd.) having a power of 160 W/cm, to form a hard coat layer having a thickness of 5 μm. The substrate with the hard coat layer was HC-2.

(Step (1) Forming of Layers (a) and (b))

The hard coat layer of the substrate HC-2 with a hard coat layer was coated with 2.8 ml/m² of a coating liquid for forming the layer (a) and was dried at 30° C. for 90 seconds. The film thickness of the layer (a) was as provided in Table 3 below.

Subsequently, a protective film (MASTAC TFB AS3-304) manufactured by Fujimori Kogyo Co., Ltd. was laminated to the dried layer (a) by peeling off a release film such that the pressure sensitive adhesive layer was on the layer (a) side. For the laminating, a commercial laminator Bio330 (manufactured by DAE-EL Co.) was used and the speed was 1. Here, the pressure sensitive adhesive layer of the protective film was the layer (b).

The protective film used is as below.

MASTACK TFB AS3-304 (optical protection film with antistatic function manufactured by Fujimori Kogyo Co., Ltd.)

Temporary support: Polyester film (thickness 38 μm)
  Pressure sensitive adhesive layer thickness: 20 μm
  Maximum transmittance at a wavelength of 250 nm to 300 nm in a state in which the release film was peeled: Less than 0.1%

(Step (1-2) Permeation of Curable Compound (a1) to Hard Coat Layer)

While the protective film was laminated, heating was performed at 100° C. for five minutes such that a portion of the curable compound (a1) permeates the hard coat layer.

(Step (2) Curing of Layer (a))

Subsequently to the heating, an opposite side to the surface covered with the layer (a) of the substrate was irradiated with ultraviolet rays having an illuminance of 200 mW/cm² and an irradiation amount of 300 mJ/cm² by using an air cooling metal halide lamp (manufactured by Eye Graphics Co., Ltd.) of 160 W/cm while purging was performed with nitrogen such that the atmosphere had an oxygen concentration of 0.01 vol % or less, so as to cure the layer (a). After the step (2), the film thicknesses of the layers (a) and (b) before the step (3) was performed were as presented in Table 3 below.

Here, in a case where the side coated with the layer (a) was irradiated with ultraviolet rays, the layer (a) was not cured.

(Step (3) Removal of Layer (b))

The protective film AS3-304 was peeled off from the cured film. After the protective film was peeled off, methyl isobutyl ketone was applied to the surface to which the protective film was adhered, such that the residues of the protective film were washed out. Thereafter, the film was dried at room temperature for 10 minutes to obtain an antireflection film 15.

(Preparation of Protective Film A)
<Synthesis of Acrylic Copolymer>

Nitrogen gas was introduced into a reactor equipped with a stirrer, a thermometer, a reflux condenser, and a nitrogen introduction pipe, and the air in the reactor was replaced with nitrogen gas. Thereafter, 100 parts by mass of a solvent (ethyl acetate) together with 100 parts by mass of isooctyl acrylate and 2.5 parts by mass of 4-hydroxybutyl acrylate were added to the reactor. Thereafter, 0.1 parts by mass of azobisisobutyronitrile as a polymerization initiator was added dropwise over 2 hours, and reaction was performed at 65° C. for eight hours so as to obtain an acrylic copolymer solution having a weight average molecular weight of 700,000.

<Preparation of Pressure Sensitive Adhesive Composition and Protective Film A>

3.5 parts by mass of CORONATE HL and 2.5 parts by mass of trioctylbenzylammonium chloride were added to the acrylic copolymer solution synthesized above (at this point, 100 parts by mass of the acrylic copolymer) and were stirred and mixed, so as to obtain a pressure sensitive adhesive composition.

A release film consisting of a silicone resin-coated polyethylene terephthalate (PET) film was coated with this pressure sensitive adhesive composition, and the solvent was removed by drying at 90° C., so as to obtain a pressure sensitive adhesive in which the thickness of the pressure sensitive adhesive layer was 20 μm.

Thereafter, a pressure sensitive adhesive film was transferred to one side of ZRT60 (manufactured by Fujifilm Corporation) which was a temporary support, so as to obtain a protective film A having a laminated structure of "ZRT60/adhesive layer/release film (silicone resin-coated PET film)".

Maximum transmittance at a wavelength of 250 nm to 300 nm in a state in which the release film was peeled was 74%.

The antireflection films 16 to 17 were prepared in the same manner as the preparation of the antireflection film 15 except for changing the kind of the coating liquid for forming the layer (a) and the kind of the protective film as in Table 3.

(Method of Evaluating Antireflection Film)

Various properties of the antireflection film were evaluated in the same method as in Example 1. Results thereof are as presented in Table 4. With respect to the obtained antireflection film, 10 μm×10 μm in the plane was observed in three visual fields with a scanning electron microscope (SEM), it was checked that a moth eye structure was formed with all the films, and the proportion of the number of particles (a2) in a state in which a plurality of kinds thereof do not exist in a direction orthogonal to the surface in an overlapped manner was 90% or greater.

EXPLANATION OF REFERENCES

1: substrate
2: antireflection layer
3: particle (a2)
4: layer (a)
5: layer (b)
10: antireflection film
A: distance between peaks of adjacent protrusions
B: distance between the center of peaks of adjacent protrusions and recessed part

TABLE 3

| | Step (1) | | | | | | Protective film | |
| | | Layer (a) | | | | | Film thickness of pressure sensitive adhesive layer (Layer (b)) | Surface tension of pressure sensitive adhesive layer (Layer (b)) (mN/m) |
| Antireflection film No. | Coating liquid | Kind of particle | Diameter of particle | Film thickness | Surface tension (mN/m) | Type | | |
|---|---|---|---|---|---|---|---|---|
| 2 | A-1 | P2 | 180 nm | 200 nm | 26.9 | — | — | — |
| 4 | A-2 | P3 | 181 nm | 200 nm | 26.9 | — | — | — |
| 15 | A-1 | P2 | 180 nm | 200 nm | 26.9 | AS3-304 | 20 μm | 29.4 |
| 16 | A-2 | P3 | 181 nm | 200 nm | 26.9 | AS3-304 | 20 μm | 29.4 |
| 17 | A-2 | P3 | 181 nm | 200 nm | 26.9 | A | 20 μm | 31.1 |

| Antireflection film No. | ΔSurface tension layer (a) − layer (b) (mN/m) | Step (2) Film thickness of layer (a) | Film thickness of layer (b) | Step (3) Removal of layer (b) | Remark |
|---|---|---|---|---|---|
| 2 | — | 60 nm | — | None | Comparative Example |
| 4 | — | 60 nm | — | None | Comparative Example |
| 15 | −2.5 | 50 nm | 20 μm | Protective film peeling + MIBK wash | Example |
| 16 | −2.5 | 50 nm | 20 μm | Protective film peeling + MIBK wash | Example |
| 17 | −4.2 | 50 nm | 20 μm | Protective film peeling + MIBK wash | Example |

TABLE 4

| Antireflection film No. | Integrated reflectance | Haze (%) | Muddiness | SW scratch resistance | Remark |
|---|---|---|---|---|---|
| 2 | 2.0% | 3.2 | D | B | Comparative Example |
| 4 | 2.2% | 4.1 | D | A | Comparative Example |
| 15 | 0.9% | 1.5 | A | B | Example |
| 16 | 1.0% | 1.8 | A | A | Example |
| 17 | 1.1% | 2.0 | A | A | Example |

It is understood that, in the antireflection film which is produced by the manufacturing method of the present invention in which the layer (b) is provided by laminating the laminate in which the layer (b) is formed on the temporary support to the laminate coated with the layer (a), the integrated reflectance is low, the haze is low, and the muddiness is excellent.

According to the present invention, it is possible to provide a method of simply manufacturing an antireflection film having satisfactory antireflection properties, having a low haze, and having low muddiness.

The invention has been described in detail and with reference to specific embodiments, but it is obvious to those skilled in the art that various changes and modifications can be made without departing from the spirit and scope of the invention.

This application is based on Japanese patent application (JP2015-135572) filed on Jul. 6, 2015, and the contents thereof are incorporated herein by reference.

What is claimed is:
1. A method of manufacturing an antireflection film, comprising, in order:
a step (1) of providing a layer (a) comprising at least one of curable compounds (a1) and particles (a2) having an average primary particle diameter of 100 nm to 380 nm and a layer (b) comprising at least one of compounds (b1) incompatible with the at least one of curable compounds (a1) so that the particles (a2) are buried in a layer which is a combination of the layer (a) and the layer (b), on a substrate;

a step (2) of curing the layer (a) in a state in which the particles (a2) are buried in the layer which is a combination of the layer (a) and the layer (b); and a step (3) of removing the layer (b) to form a moth eye structure on a surface of the layer (a) with the particles (a2).

2. The method of manufacturing an antireflection film according to claim 1,
wherein the layer (a) and the layer (b) are provided on the substrate in this order by coating.

3. The method of manufacturing an antireflection film according to claim 1,
wherein the at least one of compounds (b1) are a silicone-based component, a hydrocarbon-based component, an ester-based component, a natural animal and vegetable oils and fats, semisynthetic oils and fats, higher fatty acid, higher alcohols, or a fluorine-based component at 50° C.

4. The method of manufacturing an antireflection film according to claim 1,
wherein the at least one of compounds (b1) has a boiling point of 110° C. or higher and a kinematic viscosity of 0.1 mm$^2$/s to 100,000 mm$^2$/s at 25° C.

5. The method of manufacturing an antireflection film according to claim 4,
wherein a difference between a surface tension of a surface of the layer (a) and a surface tension of the at least one of compounds (b1) having a boiling point of 110° C. or higher is 0 to 10 mN/m.

6. The method of manufacturing an antireflection film according to claim 1,
wherein a maximum transmittance at a wavelength of 250 nm to 300 nm, in a thickness in the step (2), of the at least one of compounds (b1) is 20% or greater.

7. The method of manufacturing an antireflection film according to claim 1,
wherein, in the step (1), the layer (b) is formed by laminating a laminate obtained by providing the layer (b) on a temporary support to the layer (a).

8. The method of manufacturing an antireflection film according to claim 7,
wherein the layer (b) is a pressure sensitive adhesive layer.

9. The method of manufacturing an antireflection film according to claim 7,
wherein a difference between a surface tension of a surface of the layer (a) and a surface tension of a surface on the layer (b) side of the laminate obtained by providing the layer (b) on the temporary support is −10 to 15 mN/m.

10. The method of manufacturing an antireflection film according to claim 7,
wherein a maximum transmittance at a wavelength of 250 nm to 300 nm of the laminate obtained by providing the layer (b) on the temporary support is 20% or greater.

11. The method of manufacturing an antireflection film according to claim 1,
wherein, in the step (3), a solvent that dissolves the at least one of compounds (b1) without dissolving the substrate is used.

12. The method of manufacturing an antireflection film according to claim 1,
wherein, after the step (3), in a direction orthogonal to a surface of the substrate, a plurality of the particles (a2) do not exist.

13. The method of manufacturing an antireflection film according to claim 1,
wherein, in the steps (1) and (2), a total thickness of a thickness of a portion of the layer (a) in which the particles (a2) do not exist and a thickness of the layer (b) is greater than an average primary particle diameter of the particles (a2).

14. The method of manufacturing an antireflection film according to claim 1,
wherein the at least one of curable compounds (a1) is a compound having three or more (meth)acryloyl groups in one molecule.

15. The method of manufacturing an antireflection film according to claim 1,
wherein the particles (a2) are metal oxide particles.

16. The method of manufacturing an antireflection film according to claim 1,
wherein the particles (a2) are particles subjected to surface modification.

17. The method of manufacturing an antireflection film according to claim 1, further comprising:
a step (1-2) of causing a portion of the at least one of curable compounds (a1) to permeate the substrate between the steps (1) and (2).

18. The method of manufacturing an antireflection film according to claim 17,
wherein, in the step (1-2), a laminate having the substrate, the layer (a) and the layer (b) is heated.

19. The method of manufacturing an antireflection film according to claim 18,
wherein a temperature during the heating is 80° C. to 180° C.

20. The method of manufacturing an antireflection film according to claim 18,
wherein a boiling point of the at least one of compounds (b1) is the temperature during the heating or greater.

* * * * *